(12) United States Patent
Byun et al.

(10) Patent No.: US 7,729,234 B2
(45) Date of Patent: Jun. 1, 2010

(54) APPARATUS AND METHOD FOR TRANSMITTING UPLINK CONTROL INFORMATION IN OFDMA COMMUNICATION SYSTEMS

(75) Inventors: Myung-Kwang Byun, Suwon-si (KR); Jae-Ho Jeon, Seongnam-si (KR); Seung-Joo Maeng, Seongnam-si (KR); Jeong-Heon Kim, Anyang-si (KR); Hee-Sang Seo, Seoul (KR); Jeong-Tae Oh, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1355 days.

(21) Appl. No.: 11/106,216

(22) Filed: Apr. 14, 2005

(65) Prior Publication Data
US 2005/0232138 A1    Oct. 20, 2005

(30) Foreign Application Priority Data
Apr. 14, 2004    (KR) .................... 10-2004-0025964

(51) Int. Cl.
*H04J 11/00*    (2006.01)
*H04B 7/216*    (2006.01)
*G08C 25/02*    (2006.01)

(52) U.S. Cl. .................. 370/208; 370/335; 370/342; 714/748

(58) Field of Classification Search .................. None
See application file for complete search history.

(56) References Cited

U.S. PATENT DOCUMENTS

| | | | |
|---|---|---|---|
| 6,735,256 B1 * | 5/2004 | Toshimitsu | 375/260 |
| 6,810,007 B1 * | 10/2004 | Kim | 370/208 |
| 7,062,295 B2 * | 6/2006 | Yoshii et al. | 455/562.1 |
| 7,184,713 B2 * | 2/2007 | Kadous et al. | 455/67.13 |
| 2003/0123383 A1 * | 7/2003 | Korobkov et al. | 370/208 |
| 2004/0009783 A1 * | 1/2004 | Miyoshi | 455/522 |
| 2004/0181569 A1 * | 9/2004 | Attar et al. | 709/200 |

\* cited by examiner

*Primary Examiner*—Steven H Nguyen
(74) *Attorney, Agent, or Firm*—The Farrell Law Firm, LLP

(57) ABSTRACT

Disclosed are an apparatus and a method for transmitting uplink control information in an OFDMA communication system. The method, in which the uplink control information is transmitted using an ACK channel in the OFDMA communication system, includes the steps of receiving data bits of the uplink control information, outputting transmit symbols of sub-carriers by performing orthogonal modulation with respect to symbols for codewords of the received data bits, and inverse fast fourier transforming and transmitting a transmit signal including bundles of sub-carriers allocated the modulated transmit symbols.

18 Claims, 13 Drawing Sheets

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 0 | 1 | 2 | 3 | 4 | 5 | 6 | 0 | 1 |
| A1 | 0 | 1 | 2 | 3 | 4 | 5 | 6 | 1 | 2 | 3 | 4 | 5 | 6 | 0 | 2 | 3 |
| A2 | 0 | 1 | 2 | 3 | 4 | 5 | 6 | 2 | 3 | 4 | 5 | 6 | 0 | 1 | 4 | 5 |
| A3 | 0 | 1 | 2 | 3 | 4 | 5 | 6 | 3 | 4 | 5 | 6 | 0 | 1 | 2 | 6 | 0 |
| CODEWORD | 16 | 17 | 18 | 19 | 20 | 21 | 22 | 23 | 24 | 25 | 26 | 27 | 28 | 29 | 30 | 31 |
| A0 | 2 | 3 | 4 | 5 | 6 | 0 | 1 | 2 | 3 | 4 | 5 | 6 | 0 | 1 | 2 | 3 |
| A1 | 4 | 5 | 6 | 0 | 1 | 3 | 4 | 5 | 6 | 0 | 1 | 2 | 4 | 5 | 6 | 0 |
| A2 | 6 | 0 | 1 | 2 | 3 | 6 | 0 | 1 | 2 | 3 | 4 | 5 | 1 | 2 | 3 | 4 |
| A3 | 1 | 2 | 3 | 4 | 5 | 2 | 3 | 4 | 5 | 6 | 0 | 1 | 5 | 6 | 0 | 1 |

FIG.8

| PATTERN | TRANSMIT SYMBOL ($\theta = 2\pi/7$) | | | | | |
|---|---|---|---|---|---|---|
| 0 | 1 | 1 | 1 | 1 | 1 | 1 |
| 1 | 1 | exp(j θ) | exp(j 2θ) | exp(j 3θ) | exp(j 4θ) | exp(j 5θ) |
| 2 | 1 | exp(j 2θ) | exp(j 4θ) | exp(j 6θ) | exp(j θ) | exp(j 3θ) |
| 3 | 1 | exp(j 3θ) | exp(j 6θ) | exp(j 2θ) | exp(j 5θ) | exp(j θ) |
| 4 | 1 | exp(j 4θ) | exp(j θ) | exp(j 5θ) | exp(j 2θ) | exp(j 6θ) |
| 5 | 1 | exp(j 5θ) | exp(j 3θ) | exp(j θ) | exp(j 6θ) | exp(j 4θ) |
| 6 | 1 | exp(j 6θ) | exp(j 5θ) | exp(j 4θ) | exp(j 3θ) | exp(j 2θ) |

FIG.9

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 0 | 1 | 2 | 3 | 4 | 5 | 6 | 0 | 1 |
| A1 | 0 | 1 | 2 | 3 | 4 | 5 | 6 | 1 | 2 | 3 | 4 | 5 | 6 | 0 | 2 | 3 |
| A2 | 0 | 1 | 2 | 3 | 4 | 5 | 6 | 2 | 3 | 4 | 5 | 6 | 0 | 1 | 4 | 5 |
| A3 | 0 | 1 | 2 | 3 | 4 | 5 | 6 | 3 | 4 | 5 | 6 | 0 | 1 | 2 | 6 | 0 |
| A4 | 0 | 1 | 2 | 3 | 4 | 5 | 6 | 4 | 5 | 6 | 0 | 1 | 2 | 3 | 1 | 2 |
| A5 | 0 | 1 | 2 | 3 | 4 | 5 | 6 | 5 | 6 | 0 | 1 | 2 | 3 | 4 | 3 | 4 |
| A6 | 0 | 1 | 2 | 3 | 4 | 5 | 6 | 6 | 0 | 1 | 2 | 3 | 4 | 5 | 5 | 6 |
| A7 | 0 | 0 | 0 | 0 | 0 | 0 | 0 | 1 | 1 | 1 | 1 | 1 | 1 | 1 | 2 | 2 |
| CODEWORD | 16 | 17 | 18 | 19 | 20 | 21 | 22 | 23 | 24 | 25 | 26 | 27 | 28 | 29 | 30 | 31 |
| A0 | 2 | 3 | 4 | 5 | 6 | 0 | 1 | 2 | 3 | 4 | 5 | 6 | 0 | 1 | 2 | 3 |
| A1 | 4 | 5 | 6 | 0 | 1 | 3 | 4 | 5 | 6 | 0 | 1 | 2 | 4 | 5 | 6 | 0 |
| A2 | 6 | 0 | 1 | 2 | 3 | 6 | 0 | 1 | 2 | 3 | 4 | 5 | 1 | 2 | 3 | 4 |
| A3 | 1 | 2 | 3 | 4 | 5 | 2 | 3 | 4 | 5 | 6 | 0 | 1 | 5 | 6 | 0 | 1 |
| A4 | 3 | 4 | 5 | 6 | 0 | 5 | 6 | 0 | 1 | 2 | 3 | 4 | 2 | 3 | 4 | 5 |
| A5 | 5 | 6 | 0 | 1 | 2 | 1 | 2 | 3 | 4 | 5 | 6 | 0 | 6 | 0 | 1 | 2 |
| A6 | 0 | 1 | 2 | 3 | 4 | 4 | 5 | 6 | 0 | 1 | 2 | 3 | 3 | 4 | 5 | 6 |
| A7 | 2 | 2 | 2 | 2 | 2 | 3 | 3 | 3 | 3 | 3 | 3 | 3 | 4 | 4 | 4 | 4 |

FIG. 11

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 8 | 5 | 3 | 4 | 8 | 6 | 7 | 2 |
| A1 | 0 | 1 | 2 | 3 | 4 | 5 | 6 | 7 | 8 | 8 | 6 | 7 | 2 | 0 | 1 | 5 |
| A2 | 0 | 1 | 2 | 3 | 4 | 5 | 6 | 7 | 8 | 6 | 7 | 8 | 0 | 1 | 2 | 3 |
| CODEWORD | 16 | 17 | 18 | 19 | 20 | 21 | 22 | 23 | 24 | 25 | 26 | 27 | 28 | 29 | 30 | 31 |
| A0 | 0 | 1 | 8 | 6 | 7 | 2 | 0 | 1 | 5 | 3 | 4 | 6 | 7 | 8 | 0 | 1 |
| A1 | 3 | 4 | 6 | 7 | 8 | 0 | 1 | 2 | 3 | 4 | 5 | 2 | 0 | 1 | 5 | 3 |
| A2 | 4 | 5 | 2 | 0 | 1 | 5 | 3 | 4 | 8 | 6 | 7 | 7 | 8 | 6 | 1 | 2 |

FIG.12

| PAT-TERN | TRANSMIT SYMBOL (θ = 2π/9) | | | | | | | | |
|---|---|---|---|---|---|---|---|---|---|
| 0 | 1 | 1 | 1 | 1 | 1 | 1 | 1 | 1 | 1 |
| 1 | 1 | exp(j θ) | exp(j 2θ) | exp(j 3θ) | exp(j 4θ) | exp(j 5θ) | exp(j 6θ) | exp(j 7θ) | exp(j 8θ) |
| 2 | 1 | exp(j 2θ) | exp(j 4θ) | exp(j 6θ) | exp(j 8θ) | exp(j θ) | exp(j 3θ) | exp(j 5θ) | exp(j 7θ) |
| 3 | 1 | exp(j 3θ) | exp(j 6θ) | 1 | exp(j 3θ) | exp(j 6θ) | 1 | exp(j 3θ) | exp(j 6θ) |
| 4 | 1 | exp(j 4θ) | exp(j 8θ) | exp(j 3θ) | exp(j 7θ) | exp(j 2θ) | exp(j 6θ) | exp(j θ) | exp(j 5θ) |
| 5 | 1 | exp(j 5θ) | exp(j θ) | exp(j 6θ) | exp(j 2θ) | exp(j 7θ) | exp(j 3θ) | exp(j 8θ) | exp(j 4θ) |
| 6 | 1 | exp(j 6θ) | exp(j 3θ) | 1 | exp(j 6θ) | exp(j 3θ) | 1 | exp(j 6θ) | exp(j 3θ) |
| 7 | 1 | exp(j 7θ) | exp(j 5θ) | exp(j 3θ) | exp(j θ) | exp(j 8θ) | exp(j 6θ) | exp(j 4θ) | exp(j 2θ) |
| 8 | 1 | exp(j 8θ) | exp(j 7θ) | exp(j 6θ) | exp(j 5θ) | exp(j 4θ) | exp(j 3θ) | exp(j 2θ) | exp(j θ) |

FIG.13

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 8 | 5 | 3 | 4 | 8 | 6 | 7 | 2 |
| A1 | 0 | 1 | 2 | 3 | 4 | 5 | 6 | 7 | 8 | 8 | 6 | 7 | 2 | 0 | 1 | 5 |
| A2 | 0 | 1 | 2 | 3 | 4 | 5 | 6 | 7 | 8 | 6 | 7 | 8 | 0 | 1 | 2 | 3 |
| A3 | 0 | 1 | 2 | 3 | 4 | 5 | 6 | 7 | 8 | 2 | 0 | 1 | 5 | 3 | 4 | 8 |
| A4 | 0 | 1 | 2 | 3 | 4 | 5 | 6 | 7 | 8 | 7 | 8 | 6 | 1 | 2 | 0 | 4 |
| A5 | 0 | 1 | 2 | 3 | 4 | 5 | 6 | 7 | 8 | 4 | 5 | 3 | 7 | 8 | 6 | 1 |
| CODEWORD | 16 | 17 | 18 | 19 | 20 | 21 | 22 | 23 | 24 | 25 | 26 | 27 | 28 | 29 | 30 | 31 |
| A0 | 0 | 1 | 8 | 6 | 7 | 2 | 0 | 1 | 5 | 3 | 4 | 6 | 7 | 8 | 0 | 1 |
| A1 | 3 | 4 | 6 | 7 | 8 | 0 | 1 | 2 | 3 | 4 | 5 | 2 | 0 | 1 | 5 | 3 |
| A2 | 4 | 5 | 2 | 0 | 1 | 5 | 3 | 4 | 8 | 6 | 7 | 7 | 8 | 6 | 1 | 2 |
| A3 | 6 | 7 | 7 | 8 | 6 | 1 | 2 | 0 | 4 | 5 | 3 | 4 | 5 | 3 | 7 | 8 |
| A4 | 5 | 3 | 4 | 5 | 3 | 7 | 8 | 6 | 1 | 2 | 0 | 3 | 4 | 5 | 6 | 7 |
| A5 | 2 | 0 | 3 | 4 | 5 | 6 | 7 | 8 | 0 | 1 | 2 | 1 | 2 | 0 | 4 | 5 |

FIG.15

APPARATUS AND METHOD FOR TRANSMITTING UPLINK CONTROL INFORMATION IN OFDMA COMMUNICATION SYSTEMS

PRIORITY

This application claims priority to an application entitled "Apparatus and Method for Transmitting Uplink Control Information in OFDMA Communication System" filed in the Korean Intellectual Property Office on Apr. 14, 2004 and assigned Serial No. 2004-25964, the contents of which are incorporated herein by reference.

BACKGROUND OF THE INVENTION

1. Field of the Invention

The present invention relates to an apparatus and method for transmitting control information in a mobile communication system, and more particularly, to an apparatus and method for transmitting uplink control information in an orthogonal frequency division multiple access communication system (OFDMA).

2. Description of the Related Art

Current mobile communication systems are developing toward the $4^{th}$ generation which provides ultra high-speed multimedia services. The $4^{th}$ generation system is the end result of the $1^{st}$ generation analog mobile communication system, the $2^{nd}$ generation digital mobile communication system, and the $3^{rd}$ generation mobile communication system providing high-speed multimedia services such as the IMT-2000. This $4^{th}$ generation mobile communication system provides access to a number of networks including a satellite network, a wireless local area network (WLAN), an Internet, etc., in one mobile terminal. In effect, the $4^{th}$ generation mobile communication system can support all services of voice services, video services, multimedia services, Internet data services, voice mail services, instant message services, etc., by using one mobile terminal. The $4^{th}$ generation system strives for a transmission rate of 20 Mbps and mainly employs an orthogonal frequency division multiplexing (OFDM) scheme to provide high-speed multimedia services.

Herein, the OFDM scheme implies a digital modulation scheme for multiplexing a plurality of orthogonal carrier signals. Such an OFDM scheme is used for dividing a single data stream into several low-speed streams and simultaneously transmitting the low-speed streams by using several sub-carriers having low transmission rates.

A multiple access scheme based on the OFDM scheme is referred to as an orthogonal frequency division multiple access (OFDMA) scheme. The OFDMA scheme denotes a scheme in which sub-carriers in one OFDM symbol are distributed to a plurality of users (i.e., a plurality of subscriber terminals). A communication system based on such an OFDMA scheme includes additional physical channels for transmitting uplink control information. These physical channels include a channel quality information (CQI) channel, an ACK/NACK channel, and a coefficient for multi-input multi-output (MIMO) channel.

Hereinafter, a structure of a transmitter 10/receiver 20 for transmitting/receiving the uplink control information in the conventional OFDMA communication system will be described with reference to the accompanying drawings.

FIG. 1 is a schematic block diagram illustrating an internal structure of the transmitter 10. The transmitter 10 includes a binary channel encoder 11, a modulator 12, and an inverse fast fourier transform (IFFT) unit 13.

If information data bits of uplink control information are generated, the binary channel encoder 11 receives the information data bits and outputs a codeword to the modulator 12 by using binary channel codes (e.g., (20,5) block codes).

Herein, the modulator 12 includes a coherent modulator or a differential modulator. The modulator 12 receives the codeword output from the binary channel encoder 11, finds transmit symbols corresponding to the codeword based on a coherent modulation scheme or a differential modulation scheme, and then, outputs the transmit symbol to the IFFT unit 13. Herein, the modulator may employ a predetermined modulation scheme (e.g., a quadrature phase shift keying (QPSK) scheme or a differential quadrature phase shift keying (DQPSK) scheme).

The IFFT unit 13 receives the transmit symbol from the modulator 12, performs IFFT with respect to the transmit symbol, and then outputs the transmit symbol.

Hereinafter, an internal structure of the receiver 20 will be schematically described with reference to FIG. 2. The receiver 20 includes a fast fourier transform (FFT) unit 23, a demodulator 22, and a binary channel decoder 21. If a receive signal is input from the transmitter 10, the FFT unit 23 performs FFT with respect to the receive signal and outputs a receive symbol to the demodulator 22.

The demodulator 22 may include a coherent demodulator or a differential demodulator correspondingly to the modulator of the transmitter 10. The demodulator 22 receives the receive symbol output from the FFT unit 23 and finds a soft decision value of the receive symbol based on a demodulation scheme corresponding to the modulation scheme of the transmitter (e.g., a coherent demodulation scheme or a differential demodulation scheme).

The binary channel decoder 21 receives the soft decision value found in the demodulator 22, determines which the transmitted codeword is, and outputs information data bits corresponding to the decided codeword.

Although the uplink control information transmitted/received through the transmitter 10/the receiver 20 having the above described structure occupies a small portion in the overall communication service, it is necessary to ensure high reliability with respect to the transmission of the uplink control information because the uplink control information is very important in communication system operation. However, generally speaking, a physical channel for transmitting the uplink control information is allocated a small number of frequency-time axis resources to reduce overhead rates. Accordingly, it may be advantageous to employ a transmission method different from that for channels such as traffic channels transmitting much information and allocated many resources.

The conventional technique employs a transmission method in which binary channel encoding is combined with coherent modulation or differential modulation as described above in order to transmit the uplink control information.

However, if the uplink control information is transmitted in the transmission method using a small number of frequency-time axis resources, the number of errors may increase, thereby lowering the stability of communication system operation. In other words, the uplink control information may be transmitted with insufficient pilot tones. As a result, channel estimation performance is degraded, thereby degrading the performance of the coherent modulation/demodulation. Herein, if the number of pilot tones is increased in consideration of only channel estimation, the number of data tones may be excessively insufficient. In addition, if the binary channel encoding is performed separately from the modulation, the separation may prevent the achievement of optimized performance. Further, if many frequency-time axis resources are used for the transmission of the uplink control information to raise system stability, overhead rates may increase, thereby reducing the throughput of a communication system.

SUMMARY OF THE INVENTION

Accordingly, the present invention has been made to solve the above-mentioned problems occurring in the prior art, and an object of the present invention is to provide an apparatus and a method for efficiently transmitting uplink control information by using given frequency-time axis resources.

Another object of the present invention is to provide an apparatus and a method for transmitting uplink control information using an M-ary channel encoding scheme, where M is an integer, and a non-coherent modulation scheme in order to enhance reliability and reduce an overhead rate.

Still another object of the present invention is to provide an apparatus and a method for transmitting uplink control information, which can obtain optimized performance by combining an M-ary channel encoding scheme with a non-coherent modulation scheme.

To accomplish the above objects, there is provided a method for transmitting uplink control information using an ACK channel in a communication system based on an orthogonal frequency division multiple access scheme, the method including the steps of receiving data bits of the uplink control information; outputting transmit symbols of sub-carriers by performing orthogonal modulation with respect to symbols for codewords of the received data bits, and inverse fast fourier transforming and transmitting a transmit signal including bundles of sub-carriers being allocated the modulated transmit symbols.

According to another aspect of the present invention, there is provided a method for transmitting uplink control information using a channel quality information (CQI) channel in a communication system based on an orthogonal frequency division multiple access scheme, the method including the steps of receiving data bits of the uplink control information, outputting preset codewords corresponding to the received data bits, outputting transmit symbols of sub-carriers by performing orthogonal modulation with respect to symbols for the codewords of the received data bits, and inverse fast fourier transforming and transmitting a transmit signal including bundles of sub-carriers being allocated the modulated transmit symbols.

According to another aspect of the present invention, there is provided a method for receiving uplink control information in a communication system based on an orthogonal frequency division multiple access scheme, the method including the steps of receiving signals including preset bundles of sub-carriers from a transmitter, the preset bundles of sub-carriers being allocated orthogonal-modulated symbols which are generated by orthogonal modulating symbols for codewords corresponding to data bits of the uplink control information in the transmitter, performing fast fourier transform with respect to the received signals, calculating squared absolute values of correlation values for possible patterns in a frequency domain with respect to the bundles of sub-carriers of the fast fourier transformed signals and performing orthogonal demodulation, calculating squared absolute values of correlation values for patterns corresponding to each codeword and then a sum of the absolute values for each codeword, and determining information data bits corresponding to a maximum codeword based on the calculated summation values.

According to another aspect of the present invention, there is provided an apparatus for transmitting uplink control information in a communication system based on an orthogonal frequency division multiple access scheme, the apparatus including a non-coherent modulator for outputting transmit symbols of sub-carriers by orthogonal modulating symbols for codewords corresponding to data bits of the uplink control information and an inverse fast fourier transform unit for performing inverse fast fourier transform with respect to a transmit signal including bundles of sub-carriers being allocated the orthogonal modulated transmit symbols and transmitting the transmit signal.

According to another aspect of the present invention, there is provided an apparatus for receiving uplink control information in a communication system based on an orthogonal frequency division multiple access scheme, the apparatus including a fast fourier transform unit for performing fast fourier transform with respect to signals received from a transmitter, a non-coherent demodulator for calculating squared absolute values of correlation values for a predetermined number of possible patterns with respect to bundles of sub-carriers of the fast fourier transformed signals and performing orthogonal demodulation, an M-ary channel decoder for calculating squared absolute values of correlation values for patterns corresponding to each codeword and then a sum of the squared absolute values for each codeword and determining information data bits corresponding to a maximum codeword based on the calculated summation values.

BRIEF DESCRIPTION OF THE DRAWINGS

The above and other objects, features and advantages of the present invention will be more apparent from the following detailed description taken in conjunction with the accompanying drawings, in which:

FIG. 8 illustrates codewords output from a 7-ary channel encoder according to an embodiment of the present invention;

FIG. 9 illustrates patterns for orthogonal modulation when an OFDMA communication system employs a 7-ary channel encoder according to an embodiment the present invention;

FIG. 11 illustrates codewords output from a 7-ary channel encoder according to another embodiment the present invention;

FIG. 12 illustrates codewords output from a 9-ary channel encoder when three bundles of sub-carriers are used according to an embodiment of the present invention;

FIG. 13 illustrates nine patterns used for orthogonal modulation when an OFDMA communication system according to an embodiment of the present invention employs a 9-ary channel encoder;

FIG. 15 illustrates codewords output from a 9-ary channel encoder when three bundles of sub-carriers are used according to an embodiment of the present invention.

DETAILED DESCRIPTION OF THE PREFERRED EMBODIMENT

Figure 1:
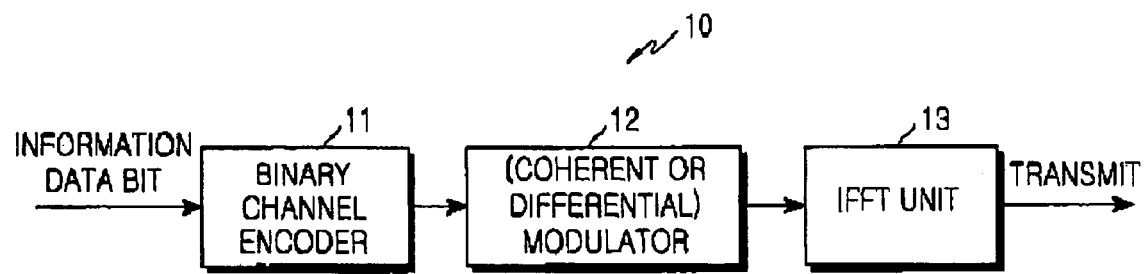
FIG. 1 is a schematic block diagram illustrating a structure of a transmitter for transmitting uplink control information in the conventional OFDMA communication system.
Figure 2:
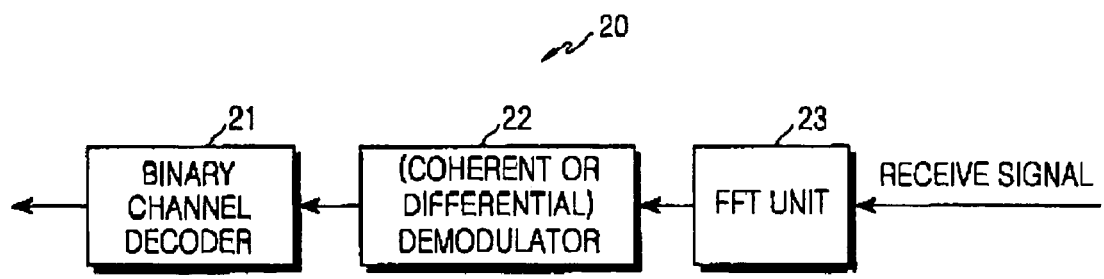
FIG. 2 is a schematic block diagram illustrating a structure of a receiver for receiving uplink control information in the conventional OFDMA communication system.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

The present invention relates to a method and an apparatus which employ an M-ary channel encoding scheme, where M is an integer, and a non-coherent modulation scheme to reduce an overhead rate and enhance reliability in the transmission of uplink control information, thereby efficiently transmitting the uplink control information. Herein, the 'M' of the 'M-ary channel encoding scheme' represents a predetermined variable.

According to an embodiment of the present invention, it is possible to efficiently transmit the uplink control information using a small number of pilot tones due to a small number of frequency-time axis resources by employing a non-coherent modulation/demodulation scheme. In addition, it is possible to relatively optimize the performance of a system by combining the M-ary channel encoding scheme with the non-coherent modulation scheme differently from the conventional technique in which a binary channel encoding scheme and a modulation scheme are separately employed.

Hereinafter, preferred embodiments of the present invention will be described based on an orthogonal frequency division multiple access (OFDMA) communication system. In addition, the present invention employing an M-ary channel encoder/decoder and a non-coherent modulator/demodulator, instead of the convential technique of using a binary channel encoder/decoder and a coherent modulator/demodulator, will be described. Transmission methods for transmitting the uplink control information will be described by distinguishing an ACK/NACK channel and a CQI channel according to an embodiment of the present invention.

Figure 3:
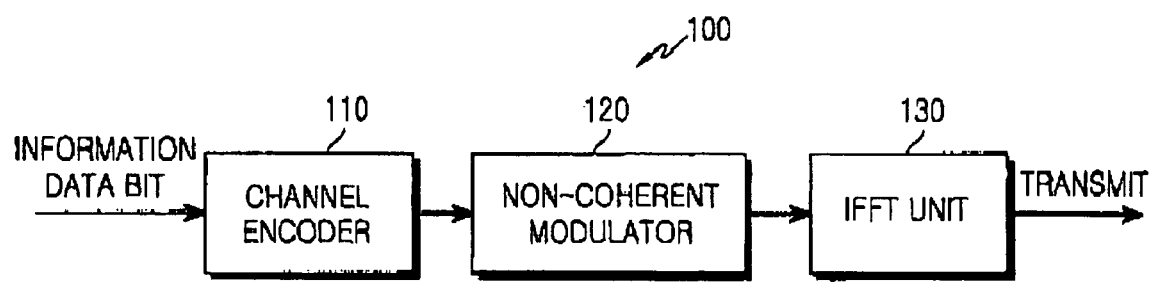
FIG. 3 is a schematic block diagram illustrating a structure of a transmitter for transmitting uplink control information in an OFDMA communication system according to an embodiment of the present invention.

First, a schematic internal structure of a transmitter 100 for transmitting the uplink control information in the OFDMA communication system according to an embodiment of the present invention will be described below with reference to FIG. 3.

The transmitter 100 includes an M-ary channel encoder 110 for encoding information data bits of the uplink control information, a non-coherent modulator 120 for modulating the codeword based on the non-coherent modulating scheme, and an inverse fast fourier transform (IFFT) unit 130 for performing IFFT with respect to a signal to be transmitted and transmitting the signal.

If information data bits of the uplink control information is generated, the M-ary channel encoder 110 receives the information data bits and outputs a codeword corresponding to the information data bits to the non-coherent modulator 120. Herein, the M-ary channel encoder 110 may employ a predetermined encoding scheme (e.g., an M-ary block encoding scheme) preset in the system.

The non-coherent modulator 120 finds transmit symbols corresponding to the codeword input from the M-ary channel encoder 110 based on a non-coherent modulation scheme and then outputs the transmit symbols to the IFFT unit 130. Herein, the non-coherent modulator 120 may employ a predetermined modulation scheme (e.g., an orthogonal modulation scheme).

The IFFT unit 130 receives the transmit symbols from the non-coherent modulator 120, performs IFFT with respect to the transmit symbols, and then, sends the transmit symbols.

Figure 4:
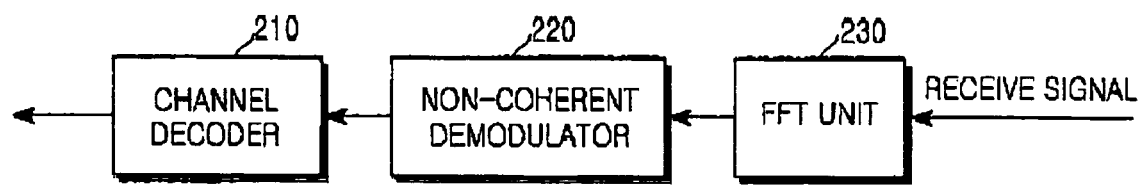
FIG. 4 is a schematic block diagram illustrating a structure of a receiver for receiving uplink control information in an OFDMA communication system according to an embodiment of the present invention.

The internal structure of the transmitter 100 is described with reference to FIG. 3, and an internal structure of a receiver 200 for receiving the uplink control information in the OFDMA communication system according to an embodiment of the present invention will be described below with reference to FIG. 4.

The receiver 200 includes a fast fourier transform (FFT) unit 230 for fast fourier transforming a receive signal in a time domain into a receive signal in a frequency domain, a non-coherent demodulator 220 for demodulating the receive signal in the frequency domain, and an M-ary channel decoder 210 for decoding the demodulated receive symbol into the information data bits of the uplink control information.

The FFT unit 230 performs FFT and outputs a receive symbol to the non-coherent demodulator 220 if a receive signal is input from the transmitter 100.

The non-coherent demodulator 220 receives the receive symbol from the FFT unit 230, finds a soft decision value of the receive symbol based on a non-coherent demodulation scheme, and then outputs the soft decision value to the M-ary channel decoder 210.

The M-ary channel decoder 210 receives the soft decision value from the non-coherent demodulator 220, determines which codeword is received from the transmitter 100, and outputs information data bits corresponding to the decided codeword.

As described above, the structure of the transmitter/receiver according to an embodiment of the present invention is described with reference to FIG. 3 or 4. Hereinafter, a method for transmitting/receiving the uplink control information using the transmitter/receiver will be described. Herein, the uplink control information includes ACK/NACK, CQI, etc. as described above, and methods for transmitting the uplink control information using an ACK/NACK channel, a CQI channel, etc., respectively, will be described below according to an embodiment of the present invention.

1. A Transmission Method Based on an ACK/NACK Channel

Hereinafter, a transmission method in a case of allocating two bundles of 2×3 sub-carriers in a frequency-time axis to the ACK channel in an uplink of the OFDMA communication system, will be described in detail according to one embodiment of the present invention.

Figure 5:
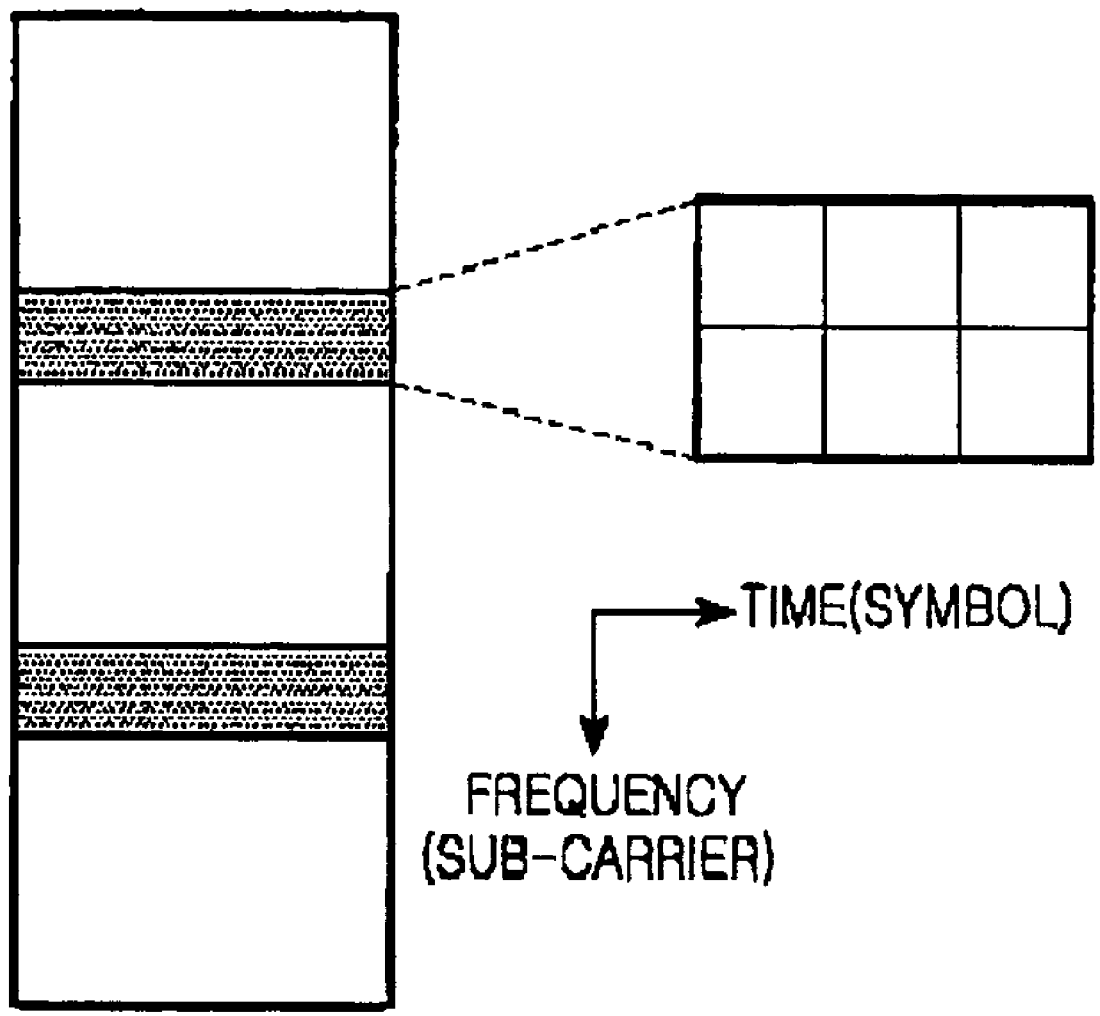
FIG. 5 illustrates frequency-time axis resources allocated for transmitting uplink control information in an OFDMA communication system according to an embodiment of the present invention.

FIG. 5 illustrates frequency-time axis resources allocated for transmitting the uplink control information in the OFDMA communication system according to an embodiment of the present invention.

An information data bit of the uplink control information to be transmitted passes through the M-ary channel encoder 110. Herein, the information data bit corresponds to one bit, and a binary channel encoder (M=2) is employed. Thereafter, the information data bit having passed through the channel encoder 110 is input to the non-coherent modulator 120. The non-coherent modulator 120 modulates the input information data bit based on an orthogonal modulation scheme. Herein, patterns employed for the orthogonal modulation may be expressed as shown in following Table 1.

TABLE 1

| Pattern | Transmit symbol |
|---|---|
| 0 | 1 1 −1 −1 1 1 |
| 1 | 1 −1 −1 1 1 −1 |

As shown in Table 1, since the information bit is input to the non-coherent modulator 120 while maintaining the value (0 or 1) of the information bit as it is, it should be noted that the omission of the M-ary channel encoder does not make the subject matter of the present invention unclear.

The non-coherent modulator 120 modulates the transmit signal based on the orthogonal modulation scheme as described above. Herein, as shown in FIG. 5, when frequency-time axis resources include two bundles of sub-carriers, two patterns to be employed for the orthogonal modulation are set as shown in Table 1. As shown in Table 1, the transmit symbol is set to '1, 1, −1, −1, 1, 1' in a case of a pattern "0" and '1, −1, −1, 1, 1, −1' in a case of a pattern "1". The transmit symbol for each pattern may be preset to any other orthogonal value when a communication system is set up.

If the 1-bit information data is input, the non-coherent modulator 120 transmits the information data based on Equation (1):

$$C_{n,k}^{ACK} = \begin{cases} M_{n,k}^{ACK} & \text{if } k = 0, 1, \ldots, 5 \\ -M_{n,k-6}^{ACK} & \text{if } k = 6, 7, \ldots, 11 \end{cases} \quad (1)$$

In Equation 1, the $$C_{n,k}^{ACK}$$

denotes a transmit symbol of a $k^{th}$ sub-carrier in an $n^{th}$ ACK channel, the $$M_{n,k}^{ACK}$$

denotes a $k^{th}$ modulation symbol of the $n^{th}$ ACK channel according to patterns used for the orthogonal modulation shown in Table 1, and the 'n' denotes an index of an ACK channel.

When two bundles of sub-carriers are employed as shown in FIG. 5, the non-coherent modulator 120 allocates the transmit symbols shown in Table 1 to the bundles of 2×3 sub-carriers. For example, if the input bit is '0', a first bundle of sub-carriers is allocated the transmit symbol '1, 1, −1, −1, 1, 1' set for the pattern "0", and a second bundle of sub-carriers is allocated the transmit symbol '−1, −1, 1, 1, −1, −1' obtained by inverting the sign of the transmit symbol '1, 1, −1, −1, 1, 1' set for the pattern "0" based on Equation 1. In Equation 1, the sign inversion occurring only when k=6, 7, . . . , 11 may be omitted, in other words, the value set when k=6, 7, . . . , 11 may be transmitted identically to the value set when k=0, 1, . . . , 5. As described above, the sign inversion for the second bundle of sub-carriers may be helpful because more random pattern can be transmitted to make the transmit symbol strong against an interference signal of regular specific patterns.

Thereafter, the non-coherent modulator 120 outputs sub-carriers allocated the transmit symbols (i.e., the transmit symbols included in the bundles of the sub-carriers) to the IFFT unit 130 in a transmission method based on Equation (1). At this time, if the information data bit is '0', the transmit symbol corresponding to the pattern "0" is found and transmitted. If the information data bit is '1', the transmit symbol corresponding to the pattern "1" is found and transmitted. Herein, the IFFT unit 130 performs IFFT with respect to the transmit symbol and transmits the transmit symbol.

The FFT unit 230 of the receiver 200 performs FFT with respect to a signal received from the transmitter 100 and then outputs the signal to the non-coherent demodulator 220. Then, the non-coherent demodulator 220 demodulates the signal having passed through the FFT unit 230 and then outputs the signal to the binary channel decoder 210. In other words, the non-coherent demodulator 220 calculates the squared absolute value of a correlation value of all possible patterns (e.g., two patterns in Table 1) with respect to each of the two bundles of 2×3 sub-carriers.

The binary channel decoder 210 calculates squared absolute values of correlation values for patterns corresponding to each of possible codewords (e.g., two codewords) and then a sum of the squared absolute values. After that, the binary channel decoder 210 detects the maximum codeword based on the calculated values. In this way, the receiver 200 determines, based on the detected maximum codeword, which information data bit the transmitter 100 has transmitted.

Hereinafter, a transmission method in a case of allocating four bundles of 2×3 sub-carriers on a frequency-time axis to the ACK channel in an uplink of the OFDMA communication system, will be described according to an alternative embodiment of the present invention.

Figure 6:
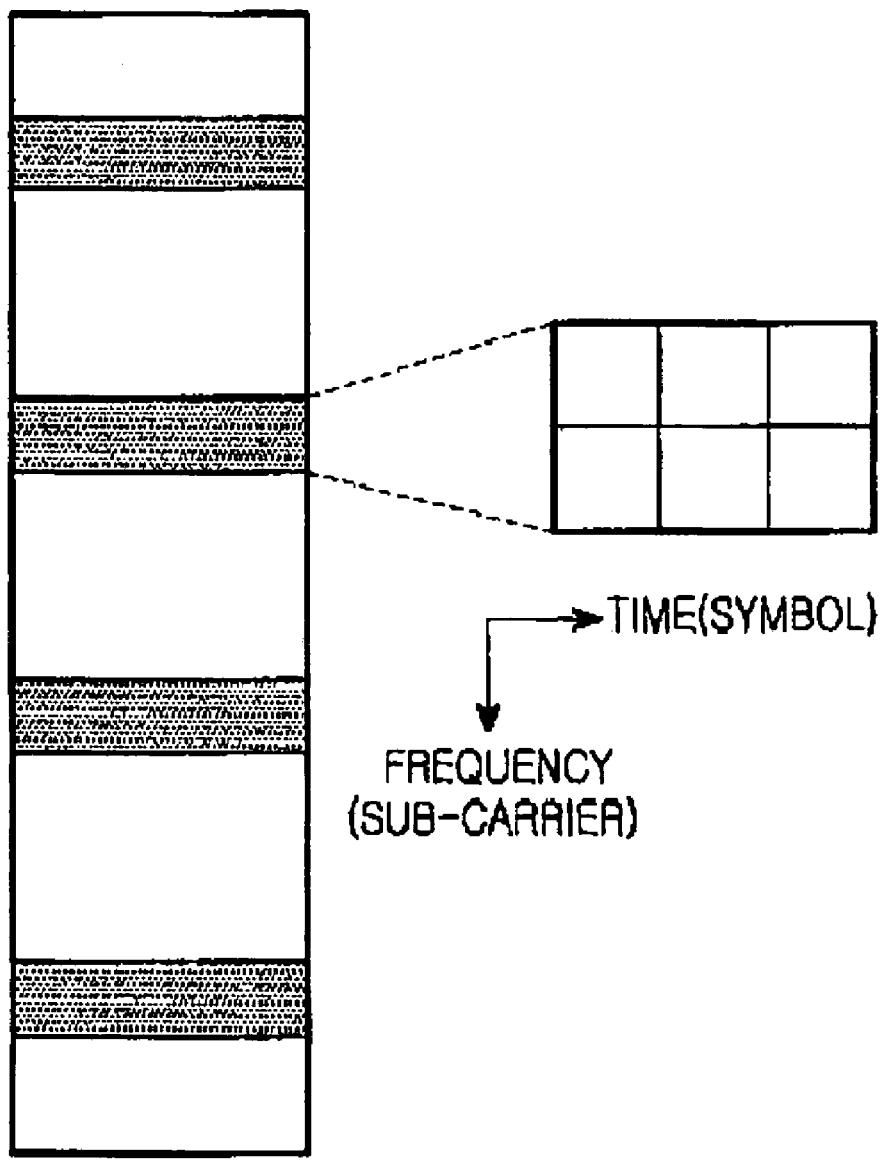
FIG. 6 illustrates frequency-time axis resources allocated for transmitting uplink control information in an OFDMA communication system according to an embodiment of the present invention.

FIG. 6 illustrates frequency-time axis resources allocated for transmitting the uplink control information in the OFDMA communication system according to an alternative embodiment of the present invention.

An information data bit passes through the M-ary channel encoder 110. Herein, the information data bit corresponds to one bit, and the M-ary channel encoder 110 employs a binary channel encoder (M=2). The non-coherent modulator 120 employs the orthogonal modulation scheme shown in Table 1.

However, in FIG. 6, if an information data bit to be transmitted is input, that is, if an 1-bit information data bit is input, the non-coherent modulator 120 transmits the 1-bit information data bit based on an orthogonal modulation scheme expressed as shown through Equation (2):

$$C_{n,k}^{ACK} = \begin{cases} M_{n,k}^{ACK} & \text{if } k = 0, 1, \ldots, 5 \\ -M_{n,k-6}^{ACK} & \text{if } k = 6, 7, \ldots, 11 \\ M_{n,k}^{ACK} & \text{if } k = 12, 13, \ldots, 17 \\ -M_{n,k-6}^{ACK} & \text{if } k = 18, 19, \ldots, 23 \end{cases} \quad (2)$$

In Equation (2), the $$C_{n,k}^{ACK}$$

denotes a transmit symbol of a $k^{th}$ sub-carrier of an $n^{th}$ ACK channel, the $$M_{n,k}^{ACK}$$

denotes a $k^{th}$ modulation symbol of the $n^{th}$ ACK channel according to patterns used for the orthogonal modulation shown in Table 1, and the 'n' denotes an index of an ACK channel.

In the transmission method based on Equation (2), a sign of a transmit symbol for a corresponding pattern is inverted only when k=6, . . . , 11 and when k=18, . . . , 23, and this sign inversion may be omitted. As described above, the sign inversion for the second or the fourth bundle of sub-carriers is used because more random pattern can be transmitted to make the transmit symbol strong against an interference signal of regular specific patterns.

Thereafter, the non-coherent modulator 120 outputs transmit symbols to the IFFT unit 130 in the transmission method based on Equation (2). Then, the IFFT unit 130 performs IFFT with respect to the transmit symbols before transmitting them.

The receiver 200 calculates squared absolute values of correlation values for two possible patterns with respect to four bundles of 2×3 sub-carriers by means of the non-coherent demodulator 220 in the transmission manner described with reference to FIG. 5. After that, the binary channel decoder 210 calculates squared absolute values of correlation values for patterns corresponding to each of two possible codewords and then a sum of the squared absolute values for each codeword. The receiver detects the maximum codeword based on the calculated values and determines, based on the detection, which information data bit the transmitter 100 has transmitted.

The above description deals with the transmission method for even number bundles of sub-carriers. Hereinafter, a transmission method for odd number bundles of sub-carriers is described according to a further alternative embodiment of the present invention. For example, a transmission method in a case of allocating three bundles of 3×3 sub-carriers on a frequency-time axis to an ACK channel in the uplink of the OFDMA communication system will be described with reference to the accompanying drawings.

Figure 7:
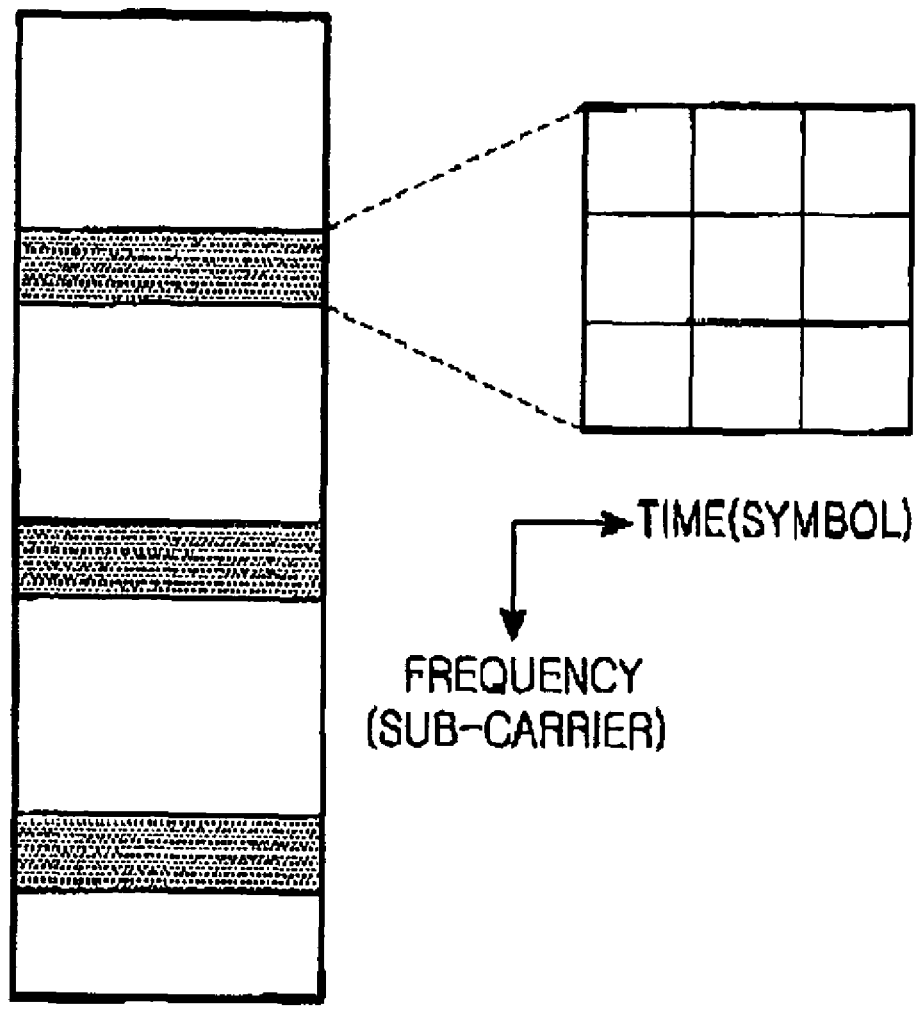
FIG. 7 illustrates frequency-time axis resources allocated for transmitting uplink control information in an OFDMA communication system according to an embodiment of the present invention.

FIG. 7 illustrates an example of allocating frequency-time axis resources to transmit the uplink control information in the OFDMA communication system according to a further alternative embodiment of the present invention.

An input information data bit passes through the M-ary channel encoder 110. Herein, the information data bit corresponds to one bit, and the M-ary channel encoder 110 employs a binary channel encoder (M=2). In addition, the M-ary channel encoder 110 may be omitted as described herein.

The information data bit of the uplink control information to be transmitted is input to the non-coherent modulator 120 through the M-ary channel encoder 110.

Then, the non-coherent modulator 120 modulates the transmit signal by employing orthogonal modulation based on Table 2.

TABLE 2

| Pattern | Transmit symbol |
|---------|-----------------|
| 0 | 1111 $\exp\left(j\frac{2\pi}{3}\right) \exp\left(j\frac{4\pi}{3}\right)$ 1 $\exp\left(j\frac{4\pi}{3}\right) \exp\left(j\frac{2\pi}{3}\right)$ |
| 1 | 1 $\exp\left(j\frac{2\pi}{3}\right) \exp\left(j\frac{4\pi}{3}\right)$ 1 $\exp\left(j\frac{4\pi}{3}\right) \exp\left(j\frac{2\pi}{3}\right)$ 111 |

If frequency-time axis resources include two bundles of sub-carriers as shown in FIG. 7, each of two patterns for the orthogonal modulation, matches with each transmit symbol having nine values as shown in Table 2. In other words, in a case of a pattern '0', the transmit symbol corresponding to the pattern '0' is set to '1, 1, 1, 1, $\exp\left(j\frac{2\pi}{3}\right)$, $\exp\left(j\frac{4\pi}{3}\right)$, 1, $\exp\left(j\frac{4\pi}{3}\right)$, $\exp\left(j\frac{2\pi}{3}\right)$', and, in a case of a pattern '1', the transmit symbol is set to '1, $\exp\left(j\frac{2\pi}{3}\right)$, $\exp\left(j\frac{4\pi}{3}\right)$, 1, $\exp\left(j\frac{4\pi}{3}\right)$, $\exp\left(j\frac{2\pi}{3}\right)$, 1, 1, 1'.

Herein, the values of the transmit symbol for each pattern are orthogonal. The values of the transmit symbol may be preset when a communication system is set up or set to another predetermined values.

If the non-coherent modulator 120 receives the 1-bit information data to be transmitted, the non-coherent modulator 120 transmits the information data in a transmit method based on Equation (3).

$$C_{n,k}^{ACK} = \begin{cases} M_{n,k}^{ACK} & \text{if } k = 0, 1, \ldots, 8 \\ \exp\left(j\frac{2\pi}{3}\right) M_{n,k-9}^{ACK} & \text{if } k = 9, 10, \ldots, 17 \\ \exp\left(j\frac{4\pi}{3}\right) M_{n,k-18}^{ACK} & \text{if } k = 18, 19, \ldots, 26 \end{cases} \quad (3)$$

In Equation 3, the $$C_{n,k}^{ACK}$$

denotes a transmit symbol of a $k^{th}$ sub-carrier of an $n^{th}$ ACK channel, the $$M_{n,k}^{ACK}$$

denotes a $k^{th}$ modulation symbol of the $n^{th}$ ACK channel according to patterns used for the orthogonal modulation shown in Table 2, and the 'n' denotes an index of an ACK channel.

If the 1-bit information data to be transmitted as described above is given, the transmitter 100 transmits the information data of the uplink control information based on Equation (3). In Equation (3), when k=9, . . . , 17, a transmit symbol for each pattern has a phase changed by the value of $$\exp\left(j\frac{2\pi}{3}\right)$$

(i.e., 120 degrees), so that the transmit symbol is allocated to a second bundle of sub-carriers. In addition, when k=18, . . . , 26, a transmit symbol for each pattern has a phase changed by the value of $$\exp\left(j\frac{4\pi}{3}\right)$$

(i.e., 240 degrees), so that the transmit symbol is allocated to a third bundle of sub-carriers. Herein, the change of the phase may be omitted. The change of the shift for the second and the third bundle of the sub-carriers described above may be helpful because more random pattern can be transmitted to make the transmit symbols strong against interference signals of regular specific patterns.

If the receiver 200 receives a transmit signal from the transmitter, the receiver 200 performs FFT with respect to the received signal by means of the FFT unit 230. After that, the receiver 200 calculates a squared absolute value of a correlation value for two possible patterns with respect to each of three bundles of 3×3 sub-carriers by means of the non-coherent demodulator 220. Then, the receiver 200 calculates squared absolute values of correlation values for patterns corresponding to each of two possible codewords and then a sum of the squared absolute values for each codeword by means of the binary channel decoder 210. After that, the receiver 200 determines information data bits corresponding to the maximum codeword based on the calculated values as the information data bits transmitted by the transmitter 100.

As described above, a description of the transmission method for the uplink control information employed for the ACK channel is given according to the above embodiments of the present invention. Hereinafter, a transmission method for uplink control information to be employed for a CQI channel will be described according to yet another embodiment of the present invention.

2. A Transmission Method for a CQI Channel

As a first transmission method based on the CQI channel, a transmission method in a case of allocating four bundles of 2×3 sub-carriers on a frequency-time axis to the CQI channel in the uplink of the OFDMA communication system, will be described with reference to the accompanying drawings. Herein, frequency-time axis resources including the four bundles of sub-carriers are shown in FIG. 6.

FIG. 8 illustrates codewords output from a 7-ary channel encoder according to one embodiment of the present invention, and FIG. 9 illustrates patterns for orthogonal modulation when the 7-ary channel encoder is employed according to an embodiment of the present invention.

Information data bits pass through an M-ary channel encoder. Herein, it is assumed that the number of the information data bits is five, and a 7-ary channel encoder (M=7) is employed according to an embodiment of the present invention. Codewords which can be output from the 7-ary channel encoder 110 are shown in FIG. 8.

In more detail, if the 5-bit information data bits are input, the 7-ary channel encoder 110 outputs one of 32 possible codewords shown in FIG. 8. Herein, the 7-ary channel encoder 110 is designed in such a manner that the minimum Hamming distance between codewords becomes maximized, when the number of the codewords and the length of the codeword are given. Herein, the Hamming distance means the number of corresponding symbol pairs having different symbol values between M-ary codewords having the same length.

For example, in codewords shown in FIG. 8, the minimum Hamming distance is set in such a manner that the minimum Hamming distance becomes maximized as '3'. In further detail, among 32 possible codewords, when a codeword index is "0", the patterns of a codeword 'A0, A1, A2, A3' for bundles of sub-carriers correspond to 0, 0, 0, and 0. In addition, when the codeword index is "7", the patterns of a codeword 'A0, A1, A2, A3' for bundles of sub-carriers correspond to 0, 1, 2, and 3. Accordingly, Hamming distance between the two codewords (i.e., the codeword of the index "0" and the codeword of the index "7") becomes '3'. Herein, the minimum Hamming distance '3' means that Hamming distance between the two codewords is at least '3' with respect to all possible pairs of codewords.

Then, the transmitter 100 modulates the information data bits (encoded through the 7-ary channel encoder 110) based on an orthogonal modulation scheme by means of the non-coherent modulator 120. Herein, the transmit symbols for seven patterns for modulation are shown in FIG. 9. In addition, the transmit symbols are preset when a communication system is set up. The transmit symbols, however, may be set to another predetermined value.

Referring to FIG. 9, if the 7-ary channel encoder 110 receives 5-bit information data to be transmitted, the encoder 110 determines the type of a codeword 'A0, A1, A2, A3' similarly to that described in FIG. 8. Subsequently, the non-coherent modulator 120 transmits transmit symbols by allocating the values of a transmit symbol for each pattern corresponding to each of the codeword elements A0, A1, A2, and A3 to each bundle of 2×3 sub-carriers. In other words, the non-coherent modulator 120 transmits the transmit symbols by allocating transmit symbols of patterns corresponding to the codeword elements A0, A1, A2, and A3 to the first bundle of the 2×3 sub-carriers, the second bundle of the 2×3 sub-carriers, the third bundle of the 2×3 sub-carriers, and the fourth bundle of the 2×3 sub-carriers, respectively, like the manner shown in FIG. 9.

In the codewords, 32 codewords can be made from the input 5-bit information data. For example, when a pattern '0' is transmitted, a transmit symbol '1, 1, 1, 1, 1, 1' set for the pattern '0' is allocated to the first bundle of the 2×3 sub-carriers. When a pattern '1' is transmitted, a transmit symbol '1, exp(jθ), exp(j2θ), exp(jθ), exp(j4θ), exp(j5θ)' set for the pattern '1' is allocated to the first bundle of the 2×3 sub-carriers.

Hereinafter, relationships between the various numerical values described above will be described according to an embodiment of the present invention.

First, the number of information data bits relates to the number of codewords. For example, if the number of the information data bits is five, the number of the codewords is equal to 32 ($2^5$) as shown in FIG. 8. In addition, 'M' of the 'M-ary channel encoder' denotes the number of patterns for modulation, and 'M' is '7' in this embodiment. Accordingly, seven types of modulation patterns are employed as shown in FIG. 9.

In addition, the value of 'M' may correspond to the alphabet size of a codeword. Herein, since the value of 'M' is seven, each element of a codeword has one of seven values (i.e., 0, 1, . . . , 6) as shown in FIG. 8.

The number of elements in a transmit symbol corresponding to a modulation pattern should be equal to the number of tones in each bundle of sub-carriers. Herein, the transmit symbol corresponding to each modulation pattern includes six elements as shown in FIG. 9, and the number of tones in a bundle of 2×3 sub-carriers is six as well, as shown in FIG. 6.

In addition, the length of each codeword should be equal to the number of bundles of sub-carriers. Herein, the length of each codeword is four as shown in FIG. 8; the number of bundles of sub-carriers is four as well, as shown in FIG. 6.

If the receiver 200 receives a signal from the transmitter 100, the receiver 200 outputs the signal to the non-coherent demodulator 220 after performing FFT on the received signal by means of the FFT unit 230. Then, the non-coherent demodulator 220 calculates squared absolute values of correlation values for seven possible patterns with respect to four bundles of 2×3 sub-carriers and then outputs the calculated values to the M-ary channel decoder 210. Herein, the M-ary channel decoder 210 employs 7-ary channel decoder (i.e., M=7) matched to the M-ary channel encoder of the transmitter 100. The 7-ary channel decoder 210 calculates squared absolute values of correlation values for patterns corresponding to each of 32 possible codewords and then a sum of the squared absolute values and determines information data bits corresponding to the maximum codeword based on the summation values as the information data bits transmitted by the transmitter 100.

Hereinafter, the comparison between the performance of the CQI channel employing the above described transmission method according to an embodiment of the present invention and the performance of the CQI channel employing the conventional transmission method will be given with reference to Table 3.

TABLE 3

| CQI transmission method | SNR @ 1% per | | Performance improvement | |
|---|---|---|---|---|
| | AWGN | PED-B 3K | AWGN | PED-B 3K |
| Conventional method | −0.52 | 0.45 | 0 | 0 |
| Present invention | −2.5 | −1.1 | 1.98 | 1.55 |

Table 3 shows performance simulation results for a transmission method in which the 7-ary channel encoder is employed and frequency-time axis resources are allocated to the CQI channel according to an embodiment of the present invention and for the conventional transmission method based on a differential quadrature phase shift keying (DQPSK) and (20,5) binary block codes. Herein, the simulation employs a signal to interference and noise ratio (SINR) (for obtaining a packet error rate (PER) of 1%) as performance measure.

As shown in Table 3, the performance is improved by 1.98 dB in an additive white Gaussian noise (AWGN) channel and by 1.55 dB in a pedestrian B (Ped-B) fading channel.

As described above, description about the first transmission method in which the four bundles of the 2×3 sub-carriers on the frequency-time axis are allocated to the CQI channel is given according to another embodiment of the present invention. Hereinafter, a second transmission method in which eight bundles of 2×3 sub-carriers on the frequency-time axis are allocated to the CQI channel in the uplink of the OFDMA communication system will be described.

Figure 10:
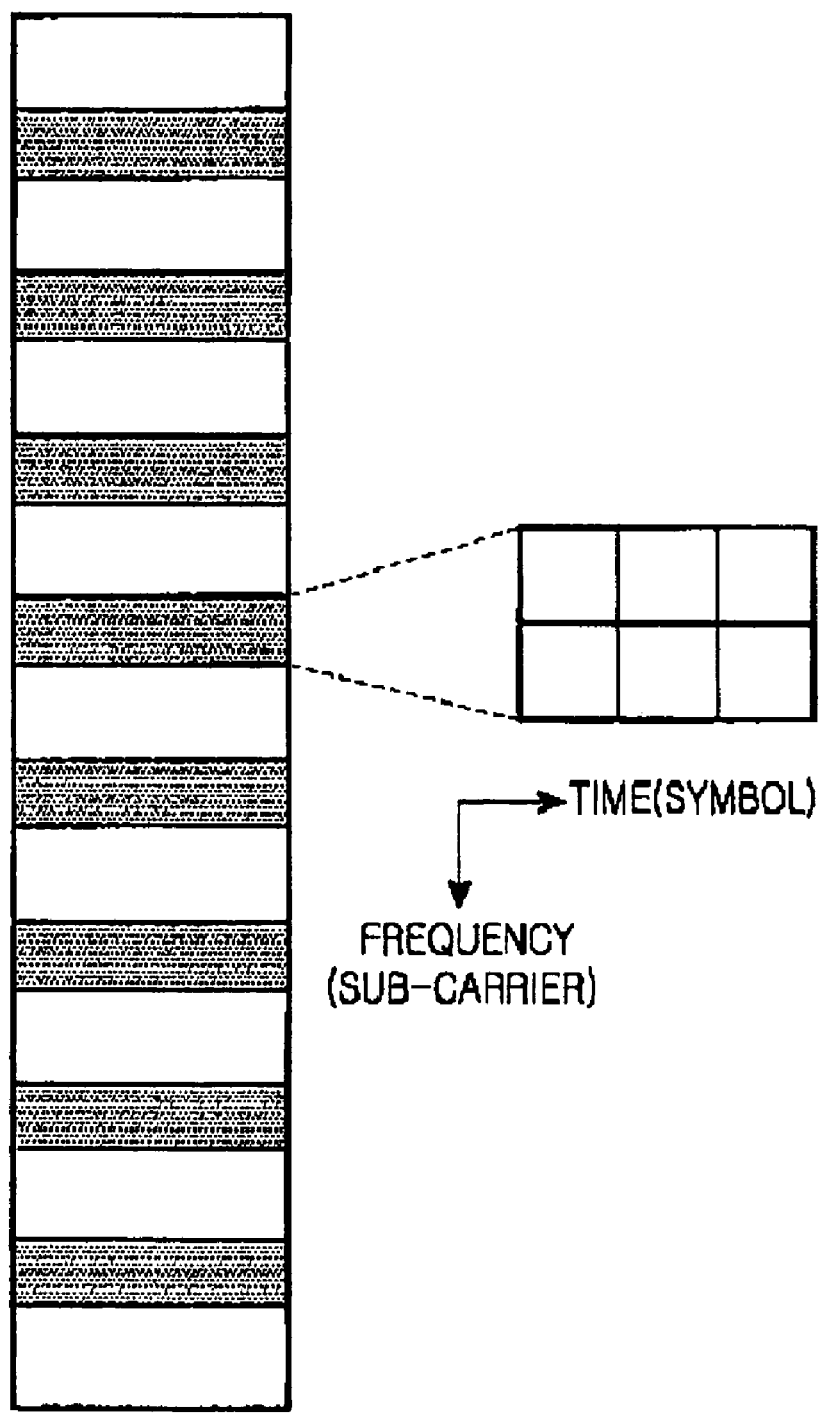
FIG. 10 illustrates an example of frequency-time axis resources allocated to a CQI channel in an uplink when an OFDMA communication system according to an embodiment of the present invention employs the 7-ary channel encoder.

FIG. 10 illustrates an example of frequency-time axis resources allocated to the CQI channel in the uplink when the OFDMA communication system according to an embodiment of the present invention employs the 7-ary channel encoder. FIG. 11 illustrates codewords output from the 7-ary channel encoder according to another embodiment of the present invention.

Referring to FIG. 10, the operation through the second transmission method is the same as that through the first transmission method described above; input information data bits pass through the M-ary channel encoder. Herein, the information data bits correspond to five bits, and a 7-ary channel encoder (M=7) is employed like that of the first transmission method. However, in the second transmission method, the transmitter 100 transmits transmit symbols allocated to the eight bundles of sub-carriers. In other words, as noted from an example about 32 codewords which can be output from the 7-ary channel encoder in FIG. 11, the 7-ary channel encoder is designed in such a manner that the minimum Hamming distance between codewords becomes maximized, when the length and the number of the codewords are given. In addition, the non-coherent modulator employs an orthogonal modulation scheme.

In the 7-ary channel encoder, when the 5-bit information data is input, codeword elements corresponding to bundles of sub-carriers are set to A0, A1, and A7 shown in FIG. 11, similarly to the seven patterns for modulation shown in FIG. 9. Since the 7-ary channel encoder is employed, this embodiment employs seven patterns. In addition, the 7-ary channel encoder outputs a codeword corresponding to the input data bits based on the 32 codewords shown in FIG. 11.

Then, if the codeword 'A0, A1, . . . , A7' is determined, the non-coherent modulator transmits transmit symbols by allocating the transmit symbols of patterns corresponding to codeword elements A0 to A7 to a first bundle of 2×3 sub-carriers to an eighth bundle of 2×3 sub-carriers, respectively, in the same manner as shown in FIG. 9.

Herein, as shown in FIG. 9, the seven patterns for modulation are set for the transmit symbols in such a manner that orthogonal modulation is achieved. The values of these transmit symbols may be preset when a communication system is set up or set to other predetermined values different from the values shown in FIG. 9.

If the receiver 200 receives a transmit signal from the transmitter 100, the receiver 200 performs FFT on the received signal by means of the FFT unit 230 and outputs the received signal to the non-coherent demodulator 220. Then, the non-coherent demodulator 220 calculates a squared absolute value of a correlation value for seven possible patterns with respect to each of the eight bundles of the 2×3 sub-carriers and then outputs the calculated values to the binary channel decoder 210. The binary channel decoder 210 calculates squared absolute values of correlation values for patterns corresponding to each of 32 possible codewords and then a sum of the squared absolute values for each codeword. Accordingly, the receiver 200 determines information data bits corresponding to a codeword having the maximum value based on the calculated values as the information data bits transmitted by the transmitter 100.

Hereinafter, a third transmission method based on a 9-ary channel encoder will be described according to a further alternative embodiment of the present invention. This third transmission method relates to a case of allocating three bundles of 3×3 sub-carriers on a frequency-time axis to the CQI channel in the uplink of the OFDMA communication system.

FIG. 12 illustrates codewords output from the 9-ary channel encoder when three bundles of sub-carriers are used, and FIG. 13 illustrates nine patterns used for orthogonal modulation when the 9-ary channel encoder is employed, both according to an embodiment of the present invention.

First, the transmitter 100 receives information data bits by means of the M-ary channel encoder 110 and outputs one of 32 possible codewords as shown in FIG. 12. Herein, the information data bits correspond to five bits, and a 9-ary channel encoder (M=9) is employed. The 9-ary channel encoder 110 is designed in such a manner that the minimum Hamming distance between codewords becomes maximized, when the length and the number of the codewords are given. For example, in codewords shown in FIG. 12, the minimum Hamming distance is set in such a manner that the minimum Hamming distance becomes maximized as '2'.

In further detail, in 32 possible codewords, when a codeword index is "0", the patterns of a codeword 'A0, A1, A2' for bundles of sub-carriers correspond to 0, 0, and 0. In addition, when the codeword index is "13", the patterns of a codeword 'A0, A1, A2' for bundles of sub-carriers correspond to 6, 0, and 1. Accordingly, a Hamming distance between two codewords becomes 2. Herein, the minimum Hamming distance 2 means that a Hamming distance between two codewords is at least 2 with respect to all possible pairs of codewords.

Then, the transmitter 100 modulates the information data bits (encoded through the 9-ary channel encoder 110) based on an orthogonal modulation scheme by means of the non-coherent modulator 120. Herein, the transmit symbols for nine patterns for the modulation are shown in FIG. 13. The transmit symbols may be preset when the communication system is set up. Herein, the values of the transmit symbols may be set to another predetermined value.

In more detail, if the 9-ary channel encoder 110 receives 5-bit information data, the encoder 110 determines the type of a codeword 'A0, A1, A2' with reference to FIG. 12. Subsequently, the non-coherent modulator 120 transmits transmit symbols by allocating a transmit symbol for each pattern corresponding to each of codeword elements A0, A1, and A2 to each bundle of 3×3 sub-carriers. Referring to FIG. 12, the non-coherent modulator 120 transmits the transmit symbols by allocating transmit symbols of patterns corresponding to the codeword elements A0, A1, and A2 to the first bundle of the 3×3 sub-carriers, the second bundle of the 3×3 sub-carriers, and the third bundle of the 3×3 sub-carriers, respectively, in the same manner as shown in FIG. 13.

In the codewords, 32 codewords are made due to the input 5-bit information data. For example, when a pattern '0' is transmitted, a transmit symbol '1, 1, 1, 1, 1, 1, 1, 1, 1' set for the pattern '0' is allocated to the first bundle of the 3×3 sub-carriers. When a pattern '1' is transmitted, a transmit symbol '1, $\exp(j\theta)$, $\exp(j2\theta)$, $\exp(j\theta)$, $\exp(j4\theta)$, $\exp(j5\theta)$, $\exp(j6\theta)$, $\exp(j7\theta)$, $\exp(j8\theta)$' set for the pattern '1' is allocated to the first bundle of the 3×3 sub-carriers.

If the receiver 200 receives a transmit signal from the transmitter 100, the receiver 200 performs FFT on the received signal by means of the FFT unit 230 and outputs the received signal to the non-coherent demodulator 220. Then, the non-coherent demodulator 220 calculates a squared absolute value of a correlation value for nine possible patterns with respect to each of the three bundles of the 3×3 sub-carriers and then outputs the calculated values to the binary channel decoder 210. The binary channel decoder 210 calculates squared absolute values of correlation values for patterns corresponding to each of 32 possible codewords and then a sum of the squared absolute values for each codeword. The receiver 200 determines information data bits corresponding to a codeword having the maximum value based on the found values as the information data bits transmitted by the transmitter 100.

Hereinafter, a fourth transmission method in a case of allocating six bundles of 3×3 sub-carriers on a frequency-time axis to the CQI channel in the uplink of the OFDMA communication system will be described according to yet another embodiment of the present invention.

Figure 14:
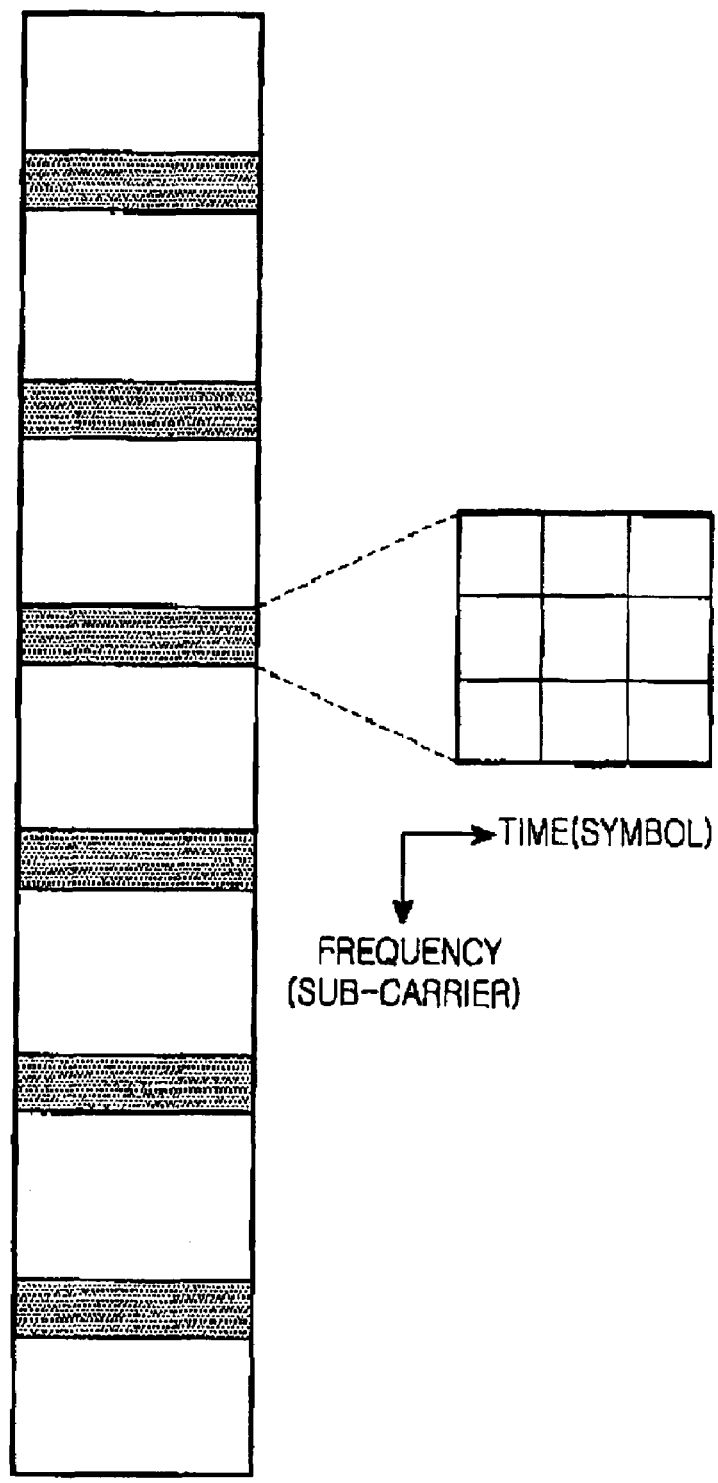
FIG. 14 illustrates frequency-time axis resources allocated to a CQI channel when an OFDMA communication system employs a 9-ary channel encoder and six bundles of sub-carriers according to an embodiment of the present invention.

FIG. 14 illustrates frequency-time axis resources allocated to the CQI channel to transmit the uplink control information when the 9-ary channel encoder and the six bundles of sub-carriers are employed according to an embodiment of the present invention. FIG. 15 illustrates codewords allocated to the bundles of sub-carriers shown in FIG. 14.

Herein, the operation through the fourth transmission method is the same as that through the third transmission method described above. However, in the fourth transmission method based on FIG. 14, the transmitter 100 transmits transmit symbols allocated to the six bundles of sub-carriers. In other words, as noted from an example for 32 codewords which can be output from the 9-ary channel encoder in FIG. 15, the 9-ary channel encoder is designed in such a manner that the minimum Hamming distance between codewords becomes maximized, when the length and the number of the codewords are given. In addition, the non-coherent modulator employs an orthogonal modulation scheme.

In the 9-ary channel encoder, if the 5-bit information data is input, codeword elements corresponding to bundles of sub-carriers are set to A0 to A5 shown in FIG. 15 correspondingly to nine patterns for modulation shown in FIG. 13. Since the 9-ary channel encoder is employed, this embodiment employs nine patterns. In addition, the 9-ary channel encoder outputs a codeword corresponding to the input data bits based on the 32 codewords shown in FIG. 15.

Then, if the codeword 'A0, A1, . . . , A5' is determined, the non-coherent modulator transmits transmit symbols by allocating the transmit symbols of patterns corresponding to the codeword elements A0 to A5 to a first bundle of the 3×3 sub-carriers to a sixth bundle of the 3×3 sub-carriers, respectively, in the same manner as shown in FIG. 13.

Herein, as shown in FIG. 15, the nine patterns for modulation are set for the transmit symbols in such a manner that orthogonal modulation is achieved. The values of these transmit symbols may be preset when a communication system is set up or set to other predetermined values different from the values shown in FIG. 15.

If the receiver 200 receives a transmit signal from the transmitter 100, the receiver 200 performs FFT on the received signal by means of the FFT unit 230 and outputs the received signal to the non-coherent demodulator 220. The non-coherent demodulator 220 calculates a squared absolute value of a correlation value for nine possible patterns with respect to each of the six bundles of the 3×3 sub-carriers and then outputs the calculated values to the binary channel decoder 210. The binary channel decoder 210 calculates squared absolute values of correlation values for patterns corresponding to each of 32 possible codewords and then a sum of the squared absolute values for each codeword. Then, the receiver 200 determines information data bits corresponding to a codeword having the maximum value based on the calculated values as the information data bits transmitted by the transmitter 100.

As described above, according to an embodiment of the present invention, it is possible to more stably transmit/receive uplink control information by performing non-coherent modulation/demodulation based on a non-coherent modulator/demodulator and an M-ary channel encoder/decoder. In addition, it is possible to reduce error probability and enhance reliability in uplink control information transmission, thereby enhancing stability of communication system operation. In addition, the enhanced reliability in the uplink control information transmission allows a smaller number of frequency-time axis resources so as to reduce overhead rates, thereby increasing the throughput of a communication system.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for transmitting uplink control information using an ACK channel in a communication system based on an orthogonal frequency division multiple access scheme, the method comprising the steps of:
   receiving data bits of the uplink control information;
   outputting transmit symbols of sub-carriers by performing orthogonal modulation with respect to symbols for codewords of the received data bits; and
   inverse fast fourier transforming and transmitting a transmit signal including bundles of sub-carriers being allocated the modulated transmit symbols,
   wherein performing the orthogonal modulation includes:
   performing orthogonal modulation with respect to symbols to be allocated to a bundle of some sub-carriers of the ACK channel according to preset transmit symbol values;
   performing orthogonal modulation with respect to symbols to be allocated to a bundle of remaining sub-carriers of the ACK channel by sign-inverting preset transmit symbol values; and
   allocating modulated symbols to the bundles of the sub-carriers to be transmitted,
   wherein the codewords are preset in such a manner that a Hamming distance becomes maximized with respect to each bundle of the sub-carriers through M-ary channel encoding,
   wherein the sign inversion is omitted and is used for transmitting random patterns, and
   wherein the orthogonal modulation includes:
   performing orthogonal modulation with respect to symbols to be allocated to a bundle of some subcarriers of the ACK channel according to preset transmit symbol values;
   performing orthogonal modulation with respect to symbols to be allocated to a bundle of remaining subcarriers of the ACK channel by performing phase change with respect to present transit symbol values; and
   allocating the modulated symbols to the bundles of the subcarriers to be transmitted.

2. The method as claimed in claim 1, wherein, if the information data bits are received, orthogonal modulation is performed and corresponding transmit symbol values are allocated to a predetermined bundle of sub-carriers by an equation, $$C_{n,k}^{ACK} = \begin{cases} M_{n,k}^{ACK} & \text{if } k = 0, 1, \ldots, 5 \\ -M_{n,k-6}^{ACK} & \text{if } k = 6, 7, \ldots, 11. \end{cases}$$

wherein $$C_{n,k}^{ACK}$$

denotes a transmit symbol of a $k^{th}$ sub-carrier in an $n^{th}$ ACK channel, $$M_{n,k}^{ACK}$$

denotes a $k^{th}$ modulation symbol of the $n^{th}$ ACK channel according to patterns used for the orthogonal modulation, and 'n' denotes an index of an ACK channel, the patterns in a table

| Pattern | Transmit symbol |
|---------|-----------------|
| 0 | 1 1 −1 −1 1 1 |
| 1 | 1 −1 −1 1 1 −1. |

3. The method as claimed in claim 1, wherein, if the information data bits are received, orthogonal modulation is performed and corresponding transmit symbol values are allocated to a predetermined bundle of sub-carriers by an equation, $$C_{n,k}^{ACK} = \begin{cases} M_{n,k}^{ACK} & \text{if } k = 0, 1, \ldots, 5 \\ -M_{n,k-6}^{ACK} & \text{if } k = 6, 7, \ldots, 11 \\ M_{n,k}^{ACK} & \text{if } k = 12, 13, \ldots, 17 \\ -M_{n,k-6}^{ACK} & \text{if } k = 18, 19, \ldots, 23 \end{cases}$$

wherein $$C_{n,k}^{ACK}$$

denotes a transmit symbol of a $k^{th}$ sub-carrier of an $n^{th}$ ACK channel, $$M_{n,k}^{ACK}$$

denotes a $k^{th}$ modulation symbol of the $n^{th}$ ACK channel according to patterns used for the orthogonal modulation, and 'n' denotes an index of an ACK channel, the patterns in a table

| Pattern | Transmit symbol |
|---------|-----------------|
| 0 | 1 1 −1 −1 1 1 |
| 1 | 1 −1 −1 1 1 −1. |

4. The method as claimed in claim 1, wherein, if the information data bits are received, orthogonal modulation is performed and transmit symbol values are allocated to a predetermined bundle of sub-carriers by an equation, $$C_{n,k}^{ACK} = \begin{cases} M_{n,k}^{ACK} & \text{if } k = 0, 1, \ldots, 8 \\ \exp\left(j\frac{2\pi}{3}\right) M_{n,k-9}^{ACK} & \text{if } k = 9, 10, \ldots, 17 \\ \exp\left(j\frac{4\pi}{3}\right) M_{n,k-18}^{ACK} & \text{if } k = 18, 19, \ldots, 26. \end{cases}$$

wherein $$C_{n,k}^{ACK}$$

denotes a transmit symbol of a $k^{th}$ sub-carrier of an $n^{th}$ ACK channel, $$M_{n,k}^{ACK}$$

denotes a $k^{th}$ modulation symbol of the $n^{th}$ ACK channel according to patterns used for the orthogonal modulation, and 'n' denotes an index of an ACK channel, the patterns in a table

| Pattern | Transmit symbol |
|---|---|
| 0 | $1111 \exp\left(j\frac{2\pi}{3}\right)\exp\left(j\frac{4\pi}{3}\right)1\exp\left(j\frac{4\pi}{3}\right)\exp\left(j\frac{2\pi}{3}\right)$ |
| 1 | $1\exp\left(j\frac{2\pi}{3}\right)\exp\left(j\frac{4\pi}{3}\right)1\exp\left(j\frac{4\pi}{3}\right)\exp\left(j\frac{2\pi}{3}\right)111.$ |

5. A method for transmitting uplink control information using a Channel Quality Information (CQI) channel in a communication system based on an orthogonal frequency division multiple access scheme, the method comprising the steps of:

receiving data bits of the uplink control information;

outputting preset codewords corresponding to the received data bits;

outputting transmit symbols of sub-carriers by performing orthogonal modulation with respect to symbols for the codewords of the received data bits; and, wherein performing the orthogonal modulation includes:

performing orthogonal modulation with respect to symbols to be allocated to bundles of sub-carriers according to preset transmit symbol values for patterns corresponding to the codeword; and allocating the modulated symbols to the bundles of the sub-carriers to be transmitted, wherein the codewords are preset in such a manner that a Hamming distance becomes maximized with respect to each bundle of the sub-carriers through M-ary channel encoding, and wherein, in a non-coherent modulator, patterns used in the orthogonal modulation for information data bits comprise a format according to one of a first table

| Pattern | Transmit symbol ($\theta = 2\pi/7$) | | | | | | |
|---|---|---|---|---|---|---|---|
| 0 | 1 | 1 | 1 | 1 | 1 | 1 | 1 |
| 1 | 1 | $\exp(j\theta)$ | $\exp(j2\theta)$ | $\exp(j3\theta)$ | $\exp(j4\theta)$ | $\exp(j5\theta)$ | |
| 2 | 1 | $\exp(j2\theta)$ | $\exp(j4\theta)$ | $\exp(j6\theta)$ | $\exp(j\theta)$ | $\exp(j3\theta)$ | |
| 3 | 1 | $\exp(j3\theta)$ | $\exp(j6\theta)$ | $\exp(j2\theta)$ | $\exp(j5\theta)$ | $\exp(j\theta)$ | |
| 4 | 1 | $\exp(j4\theta)$ | $\exp(j\theta)$ | $\exp(j5\theta)$ | $\exp(j2\theta)$ | $\exp(j6\theta)$ | |
| 5 | 1 | $\exp(j5\theta)$ | $\exp(j3\theta)$ | $\exp(j\theta)$ | $\exp(j6\theta)$ | $\exp(j4\theta)$ | |
| 6 | 1 | $\exp(j6\theta)$ | $\exp(j5\theta)$ | $\exp(j4\theta)$ | $\exp(j3\theta)$ | $\exp(j2\theta)$ | | and a second table

| Pattern | Transmit symbol ($\theta = 2\pi/9$) | | | | | | | | |
|---|---|---|---|---|---|---|---|---|---|
| 0 | 1 | 1 | 1 | 1 | 1 | 1 | 1 | 1 | 1 |
| 1 | 1 | $\exp(j\theta)$ | $\exp(j2\theta)$ | $\exp(j3\theta)$ | $\exp(j4\theta)$ | $\exp(j5\theta)$ | $\exp(j6\theta)$ | $\exp(j7\theta)$ | $\exp(j8\theta)$ |
| 2 | 1 | $\exp(j2\theta)$ | $\exp(j4\theta)$ | $\exp(j6\theta)$ | $\exp(j8\theta)$ | $\exp(j\theta)$ | $\exp(j3\theta)$ | $\exp(j5\theta)$ | $\exp(j7\theta)$ |
| 3 | 1 | $\exp(j3\theta)$ | $\exp(j6\theta)$ | 1 | $\exp(j3\theta)$ | $\exp(j6\theta)$ | 1 | $\exp(j3\theta)$ | $\exp(j6\theta)$ |
| 4 | 1 | $\exp(j4\theta)$ | $\exp(j8\theta)$ | $\exp(j3\theta)$ | $\exp(j7\theta)$ | $\exp(j6\theta)$ | $\exp(j\theta)$ | $\exp(j6\theta)$ | $\exp(j5\theta)$ |
| 5 | 1 | $\exp(j5\theta)$ | $\exp(j\theta)$ | $\exp(j6\theta)$ | $\exp(j2\theta)$ | $\exp(j7\theta)$ | $\exp(j3\theta)$ | $\exp(j8\theta)$ | $\exp(j4\theta)$ |
| 6 | 1 | $\exp(j6\theta)$ | $\exp(j3\theta)$ | 1 | $\exp(j6\theta)$ | $\exp(j3\theta)$ | 1 | $\exp(j6\theta)$ | $\exp(j3\theta)$ |
| 7 | 1 | $\exp(j7\theta)$ | $\exp(j5\theta)$ | $\exp(j3\theta)$ | $\exp(j\theta)$ | $\exp(j8\theta)$ | $\exp(j6\theta)$ | $\exp(j4\theta)$ | $\exp(j2\theta)$ |
| 8 | 1 | $\exp(j8\theta)$ | $\exp(j7\theta)$ | $\exp(j6\theta)$ | $\exp(j5\theta)$ | $\exp(j4\theta)$ | $\exp(j3\theta)$ | $\exp(j2\theta)$ | $\exp(j\theta)$. |

6. The method as claimed in claim 5, wherein the preset codewords are in a table

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 0 | 1 | 2 | 3 | 4 | 5 | 6 | 0 | 1 |
| A1 | 0 | 1 | 2 | 3 | 4 | 5 | 6 | 1 | 2 | 3 | 4 | 5 | 6 | 0 | 2 | 3 |
| A2 | 0 | 1 | 2 | 3 | 4 | 5 | 6 | 2 | 3 | 4 | 5 | 6 | 0 | 1 | 4 | 5 |
| A3 | 0 | 1 | 2 | 3 | 4 | 5 | 6 | 3 | 4 | 5 | 6 | 0 | 1 | 2 | 6 | 0 |

-continued

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 2 | 3 | 4 | 5 | 6 | 0 | 1 | 2 | 3 | 4 | 5 | 6 | 0 | 1 | 2 | 3 |
| A1 | 4 | 5 | 6 | 0 | 1 | 3 | 4 | 5 | 6 | 0 | 1 | 2 | 4 | 5 | 6 | 0 |
| A2 | 6 | 0 | 1 | 2 | 3 | 6 | 0 | 1 | 2 | 3 | 4 | 5 | 1 | 2 | 3 | 4 |
| A3 | 1 | 2 | 3 | 4 | 5 | 2 | 3 | 4 | 5 | 6 | 0 | 1 | 5 | 6 | 0 | 1. |

7. The method as claimed in claim 5, wherein the preset codewords are in a table

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 0 | 1 | 2 | 3 | 4 | 5 | 6 | 0 | 1 |
| A1 | 0 | 1 | 2 | 3 | 4 | 5 | 6 | 1 | 2 | 3 | 4 | 5 | 6 | 0 | 2 | 3 |
| A2 | 0 | 1 | 2 | 3 | 4 | 5 | 6 | 2 | 3 | 4 | 5 | 6 | 0 | 1 | 4 | 5 |
| A3 | 0 | 1 | 2 | 3 | 4 | 5 | 6 | 3 | 4 | 5 | 6 | 0 | 1 | 2 | 6 | 0 |
| A4 | 0 | 1 | 2 | 3 | 4 | 5 | 6 | 4 | 5 | 6 | 0 | 1 | 2 | 3 | 1 | 2 |
| A5 | 0 | 1 | 2 | 3 | 4 | 5 | 6 | 5 | 6 | 0 | 1 | 2 | 3 | 4 | 3 | 4 |
| A6 | 0 | 1 | 2 | 3 | 4 | 5 | 6 | 6 | 0 | 1 | 2 | 3 | 4 | 5 | 6 | 6 |
| A7 | 0 | 0 | 0 | 0 | 0 | 0 | 0 | 1 | 1 | 1 | 1 | 1 | 1 | 5 | 6 | 6 |

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 2 | 3 | 4 | 5 | 6 | 0 | 1 | 2 | 3 | 4 | 5 | 6 | 0 | 1 | 2 | 3 |
| A1 | 4 | 5 | 6 | 0 | 1 | 3 | 4 | 5 | 6 | 0 | 1 | 2 | 4 | 5 | 6 | 0 |
| A2 | 6 | 0 | 1 | 2 | 3 | 6 | 0 | 1 | 2 | 3 | 4 | 5 | 1 | 2 | 3 | 4 |
| A3 | 1 | 2 | 3 | 4 | 5 | 2 | 3 | 4 | 5 | 6 | 0 | 1 | 5 | 6 | 0 | 1 |
| A4 | 3 | 4 | 5 | 6 | 0 | 5 | 6 | 0 | 1 | 2 | 3 | 4 | 2 | 3 | 4 | 5 |
| A5 | 5 | 6 | 0 | 1 | 2 | 1 | 2 | 3 | 4 | 5 | 6 | 0 | 6 | 0 | 1 | 2 |
| A6 | 0 | 1 | 2 | 3 | 4 | 4 | 5 | 6 | 0 | 1 | 2 | 3 | 3 | 4 | 5 | 6 |
| A7 | 2 | 2 | 2 | 2 | 2 | 3 | 3 | 3 | 3 | 3 | 3 | 3 | 4 | 4 | 4 | 4. |

8. The method as claimed in claim 5, wherein the preset codewords are in a table

| codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 8 | 5 | 3 | 4 | 8 | 6 | 7 | 2 |
| A1 | 0 | 1 | 2 | 3 | 4 | 5 | 6 | 7 | 8 | 8 | 6 | 7 | 2 | 0 | 1 | 5 |
| A2 | 0 | 1 | 2 | 3 | 4 | 5 | 6 | 7 | 8 | 6 | 7 | 8 | 0 | 1 | 2 | 3 |

| codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 0 | 1 | 8 | 6 | 7 | 2 | 0 | 1 | 5 | 3 | 4 | 6 | 7 | 8 | 0 | 1 |
| A1 | 3 | 4 | 6 | 7 | 8 | 0 | 1 | 2 | 3 | 4 | 5 | 2 | 0 | 1 | 5 | 3 |
| A2 | 4 | 5 | 2 | 0 | 1 | 5 | 3 | 4 | 8 | 6 | 7 | 7 | 8 | 6 | 1 | 2. |

9. The method as claimed in claim 5, wherein the preset codewords are in a table

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 8 | 5 | 3 | 4 | 8 | 6 | 7 | 2 |
| A1 | 0 | 1 | 2 | 3 | 4 | 5 | 6 | 7 | 8 | 8 | 6 | 7 | 2 | 0 | 1 | 5 |
| A2 | 0 | 1 | 2 | 3 | 4 | 5 | 6 | 7 | 8 | 6 | 7 | 8 | 0 | 1 | 2 | 3 |
| A3 | 0 | 1 | 2 | 3 | 4 | 5 | 6 | 7 | 8 | 2 | 0 | 1 | 5 | 3 | 4 | 8 |
| A4 | 0 | 1 | 2 | 3 | 4 | 5 | 6 | 7 | 8 | 7 | 8 | 6 | 1 | 2 | 0 | 4 |
| A5 | 0 | 1 | 2 | 3 | 4 | 5 | 6 | 7 | 8 | 4 | 5 | 3 | 7 | 8 | 6 | 1 |

-continued

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 0 | 1 | 8 | 6 | 7 | 2 | 0 | 1 | 5 | 3 | 4 | 6 | 7 | 8 | 0 | 1 |
| A1 | 3 | 4 | 6 | 7 | 8 | 0 | 1 | 2 | 3 | 4 | 5 | 2 | 0 | 1 | 5 | 3 |
| A2 | 4 | 5 | 2 | 0 | 1 | 5 | 3 | 4 | 8 | 6 | 7 | 7 | 8 | 6 | 1 | 2 |
| A3 | 6 | 7 | 7 | 8 | 6 | 1 | 2 | 0 | 4 | 5 | 3 | 4 | 5 | 3 | 7 | 8 |
| A4 | 5 | 3 | 4 | 5 | 3 | 7 | 8 | 6 | 1 | 2 | 0 | 3 | 4 | 5 | 6 | 7 |
| A5 | 2 | 0 | 3 | 4 | 5 | 6 | 7 | 8 | 0 | 1 | 2 | 1 | 2 | 0 | 4 | 5. |

10. An apparatus for transmitting uplink control information in a communication system based on an orthogonal frequency division multiple access scheme, the apparatus comprising:
  allocated the orthogonal modulated transmit symbols and transmitting the transmit signal; and
  an M-ary channel encoder for receiving the data bits of the uplink control information and outputting preset codewords in such a manner that a minimum Hamming distance becomes maximized with M patterns for each bundle of sub-carriers through M-ary channel encoding, wherein the non-coherent modulator performs orthogonal modulation with respect to symbols to be allocated to a bundle of some sub-carriers according to preset transmit symbol values and performs orthogonal modulation with respect to symbols to be allocated to a bundle of remaining sub-carriers by performing sign inversion with respect to the preset transmit symbol values, and
  wherein, in the non-coherent modulator, patterns used in the orthogonal modulation for information data bits comprise a format according to one of a first table

| Pattern | Transmit symbol ($\theta = 2\pi/7$) | | | | | |
|---|---|---|---|---|---|---|
| 0 | 1 | 1 | 1 | 1 | 1 | 1 |
| 1 | 1 | $\exp(j\theta)$ | $\exp(j2\theta)$ | $\exp(j3\theta)$ | $\exp(j4\theta)$ | $\exp(j5\theta)$ |
| 2 | 1 | $\exp(j2\theta)$ | $\exp(j4\theta)$ | $\exp(j6\theta)$ | $\exp(j\theta)$ | $\exp(j3\theta)$ |
| 3 | 1 | $\exp(j3\theta)$ | $\exp(j6\theta)$ | $\exp(j2\theta)$ | $\exp(j5\theta)$ | $\exp(j\theta)$ |
| 4 | 1 | $\exp(j4\theta)$ | $\exp(j\theta)$ | $\exp(j5\theta)$ | $\exp(j2\theta)$ | $\exp(j6\theta)$ |
| 5 | 1 | $\exp(j5\theta)$ | $\exp(j3\theta)$ | $\exp(j\theta)$ | $\exp(j6\theta)$ | $\exp(j4\theta)$ |
| 6 | 1 | $\exp(j6\theta)$ | $\exp(j5\theta)$ | $\exp(j4\theta)$ | $\exp(j3\theta)$ | $\exp(j2\theta)$ | and a second table

| Pattern | Transmit symbol ($\theta = 2\pi/9$) | | | | | | | |
|---|---|---|---|---|---|---|---|---|
| 0 | 1 | 1 | 1 | 1 | 1 | 1 | 1 | 1 |
| 6 | 1 | $\exp(j6\theta)$ | $\exp(j5\theta)$ | $\exp(j4\theta)$ | $\exp(j3\theta)$ | $\exp(j2\theta)$ | | | and a second table

11. The apparatus as claimed in claim 10, wherein the non-coherent modulator performs orthogonal modulation and allocates corresponding transmit symbol values to a predetermined bundle of sub-carriers by an equation, $$C_{n,k}^{ACK} = \begin{cases} M_{n,k}^{ACK} & \text{if } k = 0, 1, \ldots, 5 \\ -M_{n,k-6}^{ACK} & \text{if } k = 6, 7, \ldots, 11 \end{cases}$$

wherein $$C_{n,k}^{ACK}$$

denotes a transmit symbol of a $k^{th}$ sub-carrier in an $n^{th}$ ACK channel, $$M_{n,k}^{ACK}$$

denotes a $k^{th}$ modulation symbol of the $n^{th}$ ACK channel according to patterns used for the orthogonal modulation, and 'n' denotes an index of an ACK channel, the patterns in a table

| Pattern | Transmit symbol |
|---|---|
| 0 | 1  1 −1 −1 1 1 |
| 1 | 1 −1 −1 1 1 −1. |

12. The apparatus as claimed in claim 10, wherein the non-coherent modulator performs orthogonal modulation and allocates corresponding transmit symbol values to a predetermined bundle of sub-carriers by an equation,

| Pattern | Transmit symbol ($\theta = 2\pi/9$) | | | | | | | | |
|---|---|---|---|---|---|---|---|---|---|
| 0 | 1 | 1 | 1 | 1 | 1 | 1 | 1 | 1 | 1 |
| 1 | 1 | $\exp(j\theta)$ | $\exp(j2\theta)$ | $\exp(j3\theta)$ | $\exp(j4\theta)$ | $\exp(j5\theta)$ | $\exp(j6\theta)$ | $\exp(j7\theta)$ | $\exp(j8\theta)$ |
| 2 | 1 | $\exp(j2\theta)$ | $\exp(j4\theta)$ | $\exp(j6\theta)$ | $\exp(j8\theta)$ | $\exp(j\theta)$ | $\exp(j3\theta)$ | $\exp(j5\theta)$ | $\exp(j7\theta)$ |
| 3 | 1 | $\exp(j3\theta)$ | $\exp(j6\theta)$ | 1 | $\exp(j3\theta)$ | $\exp(j6\theta)$ | 1 | $\exp(j3\theta)$ | $\exp(j6\theta)$ |
| 4 | 1 | $\exp(j4\theta)$ | $\exp(j8\theta)$ | $\exp(j3\theta)$ | $\exp(j7\theta)$ | $\exp(j2\theta)$ | $\exp(j6\theta)$ | $\exp(j\theta)$ | $\exp(j5\theta)$ |
| 5 | 1 | $\exp(j5\theta)$ | $\exp(j\theta)$ | $\exp(j6\theta)$ | $\exp(j2\theta)$ | $\exp(j7\theta)$ | $\exp(j3\theta)$ | $\exp(j8\theta)$ | $\exp(j4\theta)$ |
| 6 | 1 | $\exp(j6\theta)$ | $\exp(j3\theta)$ | 1 | $\exp(j6\theta)$ | $\exp(j3\theta)$ | 1 | $\exp(j6\theta)$ | $\exp(j3\theta)$ |
| 7 | 1 | $\exp(j7\theta)$ | $\exp(j5\theta)$ | $\exp(j3\theta)$ | $\exp(j\theta)$ | $\exp(j8\theta)$ | $\exp(j6\theta)$ | $\exp(j4\theta)$ | $\exp(j2\theta)$ |
| 8 | 1 | $\exp(j8\theta)$ | $\exp(j7\theta)$ | $\exp(j6\theta)$ | $\exp(j5\theta)$ | $\exp(j4\theta)$ | $\exp(j3\theta)$ | $\exp(j2\theta)$ | $\exp(j\theta)$. |

$$C_{n,k}^{ACK} = \begin{cases} M_{n,k}^{ACK} & \text{if } k = 0, 1, \ldots, 5 \\ -M_{n,k-6}^{ACK} & \text{if } k = 6, 7, \ldots, 11 \\ M_{n,k}^{ACK} & \text{if } k = 12, 13, \ldots, 17 \\ -M_{n,k-6}^{ACK} & \text{if } k = 18, 19, \ldots, 23 \end{cases}$$

wherein $C_{n,k}^{ACK}$ denotes a transmit symbol of a $k^{th}$ sub-carrier of an $n^{th}$ ACK channel, $M_{n,k}^{ACK}$ denotes a $k^{th}$ modulation symbol of the $n^{th}$ ACK channel according to patterns used for the orthogonal modulation, and 'n' denotes an index of an ACK channel, the patterns in a table

| Pattern | Transmit symbol |
|---------|-----------------|
| 0 | 1 1 −1 −1 1 1 |
| 1 | 1 −1 −1 1 1 −1. |

13. The apparatus as claimed in claim 10, wherein the non-coherent modulator performs orthogonal modulation and allocates corresponding transmit symbol values to a predetermined bundle of sub-carriers by an equation, $$C_{n,k}^{ACK} = \begin{cases} M_{n,k}^{ACK} & \text{if } k = 0, 1, \ldots, 8 \\ \exp\left(j\frac{2\pi}{3}\right) M_{n,k-9}^{ACK} & \text{if } k = 9, 10, \ldots, 17 \\ \exp\left(j\frac{4\pi}{3}\right) M_{n,k-18}^{ACK} & \text{if } k = 18, 19, \ldots, 26 \end{cases}$$

wherein $C_{n,k}^{ACK}$ denotes a transmit symbol of a $k^{th}$ sub-carrier of an $n^{th}$ ACK channel, $M_{n,k}^{ACK}$ denotes a $k^{th}$ modulation symbol of the $n^{th}$ ACK channel according to patterns used for the orthogonal modulation, and 'n' denotes an index of an ACK channel, the patterns in a table

| Pattern | Transmit symbol |
|---------|-----------------|
| 0 | $1\,1\,1\,1\,\exp\left(j\frac{2\pi}{3}\right)\exp\left(j\frac{4\pi}{3}\right)1\,\exp\left(j\frac{4\pi}{3}\right)\exp\left(j\frac{2\pi}{3}\right)$ |
| 1 | $1\,\exp\left(j\frac{2\pi}{3}\right)\exp\left(j\frac{4\pi}{3}\right)1\,\exp\left(j\frac{4\pi}{3}\right)\exp\left(j\frac{2\pi}{3}\right)1\,1\,1.$ |

14. The apparatus as claimed in claim 10, wherein the codewords are preset in system set up and are in a table

| Codeword | 0 | 1 | 2 | 3 | 4 | 5 | 6 | 7 | 8 | 9 | 10 | 11 | 12 | 13 | 14 | 15 |
|----------|---|---|---|---|---|---|---|---|---|---|----|----|----|----|----|----|
| A0 | 0 | 1 | 2 | 3 | 4 | 5 | 6 | 0 | 1 | 2 | 3 | 4 | 5 | 6 | 0 | 1 |
| A1 | 0 | 1 | 2 | 3 | 4 | 5 | 6 | 1 | 2 | 3 | 4 | 5 | 6 | 0 | 2 | 3 |
| A2 | 0 | 1 | 2 | 3 | 4 | 5 | 6 | 2 | 3 | 4 | 5 | 6 | 0 | 1 | 4 | 5 |
| A3 | 0 | 1 | 2 | 3 | 4 | 5 | 6 | 3 | 4 | 5 | 6 | 0 | 1 | 2 | 6 | 0 |

| Codeword | 16 | 17 | 18 | 19 | 20 | 21 | 22 | 23 | 24 | 25 | 26 | 27 | 28 | 29 | 30 | 31 |
|----------|----|----|----|----|----|----|----|----|----|----|----|----|----|----|----|----|
| A0 | 2 | 3 | 4 | 5 | 6 | 0 | 1 | 2 | 3 | 4 | 5 | 6 | 0 | 1 | 2 | 3 |
| A1 | 4 | 5 | 6 | 0 | 1 | 3 | 4 | 5 | 6 | 0 | 1 | 2 | 4 | 5 | 6 | 0 |
| A2 | 6 | 0 | 1 | 2 | 3 | 6 | 0 | 1 | 2 | 3 | 4 | 5 | 1 | 2 | 3 | 4 |
| A3 | 1 | 2 | 3 | 4 | 5 | 2 | 3 | 4 | 5 | 6 | 0 | 1 | 5 | 6 | 0 | 1. |

15. The apparatus as claimed in claim 10, wherein the codewords are preset in system set up and are in a table

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 0 | 1 | 2 | 3 | 4 | 5 | 6 | 0 | 1 |
| A1 | 0 | 1 | 2 | 3 | 4 | 5 | 6 | 1 | 2 | 3 | 4 | 5 | 6 | 0 | 2 | 3 |
| A2 | 0 | 1 | 2 | 3 | 4 | 5 | 6 | 2 | 3 | 4 | 5 | 6 | 0 | 1 | 4 | 5 |
| A3 | 0 | 1 | 2 | 3 | 4 | 5 | 6 | 3 | 4 | 5 | 6 | 0 | 1 | 2 | 6 | 0 |
| A4 | 0 | 1 | 2 | 3 | 4 | 5 | 6 | 4 | 5 | 6 | 0 | 1 | 2 | 3 | 1 | 2 |
| A5 | 0 | 1 | 2 | 3 | 4 | 5 | 6 | 5 | 6 | 0 | 1 | 2 | 3 | 4 | 3 | 4 |
| A6 | 0 | 1 | 2 | 3 | 4 | 5 | 6 | 6 | 0 | 1 | 2 | 3 | 4 | 5 | 6 | 6 |
| A7 | 0 | 0 | 0 | 0 | 0 | 0 | 0 | 1 | 1 | 1 | 1 | 1 | 1 | 5 | 6 | 6 |

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 2 | 3 | 4 | 5 | 6 | 0 | 1 | 2 | 3 | 4 | 5 | 6 | 0 | 1 | 2 | 3 |
| A1 | 4 | 5 | 6 | 0 | 1 | 3 | 4 | 5 | 6 | 0 | 1 | 2 | 4 | 5 | 6 | 0 |
| A2 | 6 | 0 | 1 | 2 | 3 | 6 | 0 | 1 | 2 | 3 | 4 | 5 | 1 | 2 | 3 | 4 |
| A3 | 1 | 2 | 3 | 4 | 5 | 2 | 3 | 4 | 5 | 6 | 0 | 1 | 5 | 6 | 0 | 1 |
| A4 | 3 | 4 | 5 | 6 | 0 | 5 | 6 | 0 | 1 | 2 | 3 | 4 | 2 | 3 | 4 | 5 |
| A5 | 5 | 6 | 0 | 1 | 2 | 1 | 2 | 3 | 4 | 5 | 6 | 0 | 6 | 0 | 1 | 2 |
| A6 | 0 | 1 | 2 | 3 | 4 | 4 | 5 | 6 | 0 | 1 | 2 | 3 | 3 | 4 | 5 | 6 |
| A7 | 2 | 2 | 2 | 2 | 2 | 3 | 3 | 3 | 3 | 3 | 3 | 3 | 4 | 4 | 4 | 4. |

16. The apparatus as claimed in claim 10, wherein the codewords are preset in system set up and are in a table

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 8 | 5 | 3 | 4 | 8 | 6 | 7 | 2 |
| A1 | 0 | 1 | 2 | 3 | 4 | 5 | 6 | 7 | 8 | 8 | 6 | 7 | 2 | 0 | 1 | 5 |
| A2 | 0 | 1 | 2 | 3 | 4 | 5 | 6 | 7 | 8 | 6 | 7 | 8 | 0 | 1 | 2 | 3 |

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 0 | 1 | 8 | 6 | 7 | 2 | 0 | 1 | 5 | 3 | 4 | 6 | 7 | 8 | 0 | 1 |
| A1 | 3 | 4 | 6 | 7 | 8 | 0 | 1 | 2 | 3 | 4 | 5 | 2 | 0 | 1 | 5 | 3 |
| A2 | 4 | 5 | 2 | 0 | 1 | 5 | 3 | 4 | 8 | 6 | 7 | 7 | 8 | 6 | 1 | 2. |

17. The apparatus as claimed in claim 10, wherein the codewords are preset in system set up and are in a table

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 8 | 5 | 3 | 4 | 8 | 6 | 7 | 2 |
| A1 | 0 | 1 | 2 | 3 | 4 | 5 | 6 | 7 | 8 | 8 | 6 | 7 | 2 | 0 | 1 | 5 |
| A2 | 0 | 1 | 2 | 3 | 4 | 5 | 6 | 7 | 8 | 6 | 7 | 8 | 0 | 1 | 2 | 3 |
| A3 | 0 | 1 | 2 | 3 | 4 | 5 | 6 | 7 | 8 | 2 | 0 | 1 | 5 | 3 | 4 | 8 |
| A4 | 0 | 1 | 2 | 3 | 4 | 5 | 6 | 7 | 8 | 7 | 8 | 6 | 1 | 2 | 0 | 4 |
| A5 | 0 | 1 | 2 | 3 | 4 | 5 | 6 | 7 | 8 | 4 | 5 | 3 | 7 | 8 | 6 | 1 |

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 0 | 1 | 8 | 6 | 7 | 2 | 0 | 1 | 5 | 3 | 4 | 6 | 7 | 8 | 0 | 1 |
| A1 | 3 | 4 | 6 | 7 | 8 | 0 | 1 | 2 | 3 | 4 | 5 | 2 | 0 | 1 | 5 | 3 |
| A2 | 4 | 5 | 2 | 0 | 1 | 5 | 3 | 4 | 8 | 6 | 7 | 7 | 8 | 6 | 1 | 2 |
| A3 | 6 | 7 | 7 | 8 | 6 | 1 | 2 | 0 | 4 | 5 | 3 | 4 | 5 | 3 | 7 | 8 |
| A4 | 5 | 3 | 4 | 5 | 3 | 7 | 8 | 6 | 1 | 2 | 0 | 3 | 4 | 5 | 6 | 7 |
| A5 | 2 | 0 | 3 | 4 | 5 | 6 | 7 | 8 | 0 | 1 | 2 | 1 | 2 | 0 | 4 | 5. |

18. The apparatus as claimed in claim 10, wherein the uplink control information is transmitted through an ACK channel or a Channel Quality Information (CQI) channel.

* * * * *